(12) United States Patent
Muthukrishnan et al.

(10) Patent No.: US 7,623,524 B2
(45) Date of Patent: Nov. 24, 2009

(54) SCHEDULING SYSTEM UTILIZING POINTER PERTURBATION MECHANISM TO IMPROVE EFFICIENCY

(75) Inventors: Raman Muthukrishnan, Santa Clara, CA (US); Anujan Varma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 10/744,430

(22) Filed: Dec. 22, 2003

(65) Prior Publication Data

US 2005/0135398 A1    Jun. 23, 2005

(51) Int. Cl.
*H04L 12/28* (2006.01)
*H04L 12/54* (2006.01)

(52) U.S. Cl. .................. 370/395.41; 370/395.42; 370/428

(58) Field of Classification Search ......... 370/411–418, 370/474, 395.4, 395.41, 395.42, 428, 429
See application file for complete search history.

(56) References Cited

U.S. PATENT DOCUMENTS

| | | | |
|---|---|---|---|
| 4,092,732 A | 5/1978 | Ouchi | |
| 4,331,956 A | 5/1982 | Anderson et al. | |
| 4,335,458 A | 6/1982 | Krol | |
| 4,695,999 A | 9/1987 | Lebizay | |
| 5,127,000 A | 6/1992 | Henrion | |
| 5,191,578 A | 3/1993 | Lee | |
| 5,260,935 A | 11/1993 | Turner | |
| 5,274,785 A | 12/1993 | Kuddes | |
| 5,442,752 A | 8/1995 | Styczinski | |
| 5,483,523 A | 1/1996 | Nederlof | |
| 5,535,221 A | 7/1996 | Hijikata et al. | |
| 5,649,157 A | 7/1997 | Williams | |
| 5,682,493 A | 10/1997 | Yung | |
| 5,832,278 A | 11/1998 | Pham | |
| 5,848,434 A | 12/1998 | Young | |
| 5,859,835 A | 1/1999 | Varma | |
| 5,860,097 A | 1/1999 | Johnson | |
| 5,898,688 A | 4/1999 | Norton et al. | |
| 5,978,951 A | 11/1999 | Lawler | |
| 6,052,368 A | 4/2000 | Aybay | |
| 6,055,625 A | 4/2000 | Nakada | |
| 6,061,345 A | 5/2000 | Hahn | |
| 6,167,508 A | 12/2000 | Farrell | |
| 6,170,032 B1 | 1/2001 | Izzard | |
| 6,188,698 B1 | 2/2001 | Galand | |

(Continued)

*Primary Examiner*—Kwang B Yao
*Assistant Examiner*—Juvena Loo
(74) *Attorney, Agent, or Firm*—Ryder IP Law; Douglas J. Ryder

(57) ABSTRACT

In general, in one aspect, the disclosure describes a switching device that includes a plurality of ingress ports to receive data from external sources and a plurality of egress ports to transmit data to external destinations. The switching device also includes a plurality of queues to store data waiting to be transmitted from a particular ingress port to a particular egress port. A request generator generates requests for permission to transmit data for the queues. A request indicates a cumulative amount of data contained in a respective queue. A switching matrix provides selective connectivity between the ingress ports and the egress ports. The switching device further includes a scheduler to receive the requests, generate grants based thereon, and configure the switching matrix. The scheduler incorporates a mechanism to periodically monitor its operating efficiency and perturb its internal state when its efficiency is below a certain desired level.

31 Claims, 18 Drawing Sheets

U.S. PATENT DOCUMENTS

| | | | |
|---|---|---|---|
| 6,195,331 B1 | 2/2001 | Tani | |
| 6,282,686 B1 | 8/2001 | Cypher | |
| 6,321,306 B1 | 11/2001 | Arimilli | |
| 6,359,891 B1 | 3/2002 | Bergantino | |
| 6,408,378 B1 | 6/2002 | O'Connor | |
| 6,418,148 B1* | 7/2002 | Kumar et al. | 370/468 |
| 6,463,063 B1 | 10/2002 | Bianchini, Jr. et al. | |
| 6,665,495 B1 | 12/2003 | Miles et al. | |
| 6,785,768 B2 | 8/2004 | Peters et al. | |
| 6,804,692 B2 | 10/2004 | Davidson et al. | |
| 6,836,479 B1* | 12/2004 | Sakamoto et al. | 370/389 |
| 6,862,293 B2 | 3/2005 | Lay et al. | |
| 6,950,448 B2 | 9/2005 | Tornetta et al. | |
| 6,993,041 B2 | 1/2006 | Yamamoto | |
| 6,999,413 B2 | 2/2006 | Moriwaki et al. | |
| 7,023,840 B2 | 4/2006 | Golla et al. | |
| 7,023,841 B2 | 4/2006 | Dell et al. | |
| 7,058,053 B1* | 6/2006 | Schober | 370/390 |
| 7,161,906 B2 | 1/2007 | Dell et al. | |
| 7,212,525 B2 | 5/2007 | Moriwaki et al. | |
| 7,224,703 B2 | 5/2007 | Antal et al. | |
| 7,233,590 B2 | 6/2007 | Beshai | |
| 7,245,641 B2 | 7/2007 | Kim et al. | |
| 7,246,303 B2 | 7/2007 | Bansal et al. | |
| 7,324,541 B2 | 1/2008 | Muthukrishnan et al. | |
| 2001/0009552 A1 | 7/2001 | Parruck et al. | |
| 2001/0021174 A1 | 9/2001 | Luijten et al. | |
| 2001/0038629 A1 | 11/2001 | Shinohara | |
| 2002/0075883 A1* | 6/2002 | Dell et al. | 370/413 |
| 2002/0085578 A1 | 7/2002 | Dell et al. | |
| 2002/0097733 A1 | 7/2002 | Yamamoto | |
| 2002/0110086 A1 | 8/2002 | Reches | |
| 2002/0176429 A1 | 11/2002 | Calvignac et al. | |
| 2002/0176431 A1* | 11/2002 | Golla et al. | 370/412 |
| 2003/0147347 A1 | 8/2003 | Chen et al. | |
| 2003/0182480 A1 | 9/2003 | Varma et al. | |
| 2004/0017778 A1 | 1/2004 | Bansal et al. | |
| 2004/0037302 A1 | 2/2004 | Varma et al. | |
| 2004/0252688 A1 | 12/2004 | May et al. | |
| 2005/0015388 A1 | 1/2005 | Dasgupta et al. | |
| 2005/0129020 A1 | 6/2005 | Doyle et al. | |
| 2005/0135355 A1 | 6/2005 | Muthukrishnan et al. | |
| 2005/0135356 A1 | 6/2005 | Muthukrishnan et al. | |
| 2006/0165070 A1 | 7/2006 | Hall et al. | |
| 2006/0251124 A1 | 11/2006 | Colmant et al. | |
| 2008/0159145 A1 | 7/2008 | Muthukrishnan et al. | |

* cited by examiner

| REQUEST ENCODING | AMOUNT OF DATA IN QUEUE (IN TERMS OF FRAMES) |
|---|---|
| 0000 | EMPTY |
| 0001 | 0 - 1/4 FRAME (1/4 EXCLUDED) |
| 0010 | 1/4 TO 1/2 FRAME |
| 0011 | 1/2 TO 3/4 FRAME |
| 0100 | 3/4 TO 1 FRAME |
| 0101 | 1 TO 1.25 FRAMES |
| 0110 | 1.25 TO 1.50 FRAMES |
| 0111 | 1.50 TO 1.75 FRAMES |
| 1000 | 1.75 TO 2.00 FRAMES |
| 1001 | 2.00 TO 2.25 FRAMES |
| 1010 | 2.25 TO 2.50 FRAMES |
| 1011 | 2.50 TO 2.75 FRAMES |
| 1100 | 2.75 TO 3.00 FRAMES |
| 1101 | 3.00 TO 3.26 FRAMES |
| 1110 | 3.25 TO 3.50 FRAMES |
| 1111 | > 3.50 FRAMES |

*FIG. 8*

| HIGHEST PRIORITY REQUST THAT IS PART OF THE FRAME | FRAME STATUS (PARTIAL/FULL) | SPL 3-BIT |
|---|---|---|
| 0 | FULL FRAME | 0 |
| 1 | FULL FRAME | 1 |
| 2 | FULL FRAME | 2 |
| 3 | FULL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

*FIG. 9A*

| HIGHEST PRIORITY REQUST THAT IS PART OF THE FRAME | FRAME STATUS (PARTIAL/FULL AND AGING) | SPL 3-BIT |
|---|---|---|
| 0 | FULL FRAME OR AGED OUT PARTIAL FRAME | 0 |
| 1 | FULL FRAME OR AGED OUT PARTIAL FRAME | 1 |
| 2 | FULL FRAME OR AGED OUT PARTIAL FRAME | 2 |
| 3 | FULL FRAME OR AGED OUT PARTIAL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

FIG. 9B

| SPL | NUMBER OF INTERATIONS | CUMULATIVE NUMBER OF ITERATIONS |
|---|---|---|
| 0 | 3 | 3 |
| 1 | 2 | 5 |
| 2 | 2 | 7 |
| 3 | 2 | 9 |
| 4 | 2 | 11 |
| 5 | 2 | 13 |
| 6 | 2 | 15 |

FIG. 11

| PRIORITY 3 | PRIORITY 2 | PRIORITY 1 | PRIORITY 0 |
|---|---|---|---|
| 0 | 1 | 0 | 1 |

*FIG. 13*

SCHEDULING SYSTEM UTILIZING POINTER PERTURBATION MECHANISM TO IMPROVE EFFICIENCY

BACKGROUND

Store-and-forward devices, such as switches and routers, are used in packet networks, such as the Internet, for directing traffic at interconnection points. The store-and-forward devices include a plurality of line cards for receiving and transmitting data from/to external sources. The line cards are connected to one another via a backplane and a switching fabric. The backplane provides data paths between line cards and the switching fabric and the switching fabric provides configurable data paths between line cards. The line cards receiving data from external sources (ingress ports) receive data (packets) of various sizes. The data received are stored in queues prior to being transmitted to the appropriate line cards for transmission to external sources (egress ports). The packets include a header that identifies the destination of the packet. The packet is stored in the queue associated with that destination. The packet may also identify a priority for the data and the ingress port may also include queues for the various priorities.

The ingress ports send requests for transmitting data to a scheduler within the switching fabric. The scheduler generates grants for the queues that should transmit packets therefrom. The packets are switched through a crossbar switching matrix in batches. A batch consists of at most one packet selected from each input port. Thus, no more than one of the packets is destined for each output port. All the packets in a batch are transferred in parallel across the crossbar switching matrix. While the packets from a scheduled batch are being transferred through the crossbar, the scheduler can select the packets to form the next batch, so that the transmission of the new batch of packets can start as soon as transmission of the current batch ends. At the end of the batch of packets, the fabric scheduler re-configures the crossbar-switching matrix so as to connect the input ports to the corresponding output ports, where its next packet is destined to. Because the packets are transferred in batches, the switching paths in the crossbar-switching matrix is kept unchanged for the duration of the longest packet being transferred across the crossbar in that batch. For example, when a 50-byte packet and a 1500-byte packet are part of the same batch, the crossbar is maintained in the same configuration for the duration of the 1500-byte packet, and only $\frac{1}{30}^{th}$ of the bandwidth of the path is used by the 50-byte packet.

The variable-size packets may be divided into fixed-size units (segments) before switching through the crossbar switching fabric. The segments are combined into the original packet at the output of the fabric. The fabric scheduler selects at most one segment from each input port to form a batch, such that the destination port numbers associated with the cells in the same batch are distinct. The segment size is typically chosen to correspond to the size of the smallest packet switched by the fabric, plus the size of any internal headers added by the router or switch before passing the packet through the fabric. The fabric scheduler computes a new schedule for each batch of segments during the transmission time of the segments. In a high-speed switch, this time interval can be extremely short. For example, with a cell size of 64 bytes and a port rate of 10 Gigabits/second, the fabric scheduler schedules a new batch of cells every 51.2 nanoseconds. The crossbar switching matrix is also configured at intervals of 51.2 nanoseconds. As the port speed is increased, both the fabric scheduler and the crossbar reconfiguration are made correspondingly faster.

The ideal operation of a scheduler would be to match all of the requests in the most efficient manner taking the least possible time. That is, the scheduler should attempt to find the maximum number of matches in each iteration so that it would take the least amount of time to process all of the requests. However, there is no guarantee that the scheduler can reach this ideal condition. In fact arbiters may get themselves in a locked state where the matches repeat themselves.

BRIEF DESCRIPTION OF THE DRAWINGS

The features and advantages of the various embodiments will become apparent from the following detailed description in which:

FIG. 8 illustrates an exemplary encoding scheme for quantizing the amount of data based on frames, according to one embodiment;

FIGS. 9A-B illustrate exemplary SPL mapping tables, according to one embodiment;

FIG. 11 illustrates an exemplary SPL iteration table, according to one embodiment.

FIG. 13 illustrates an exemplary grant service bitmap, according to one embodiment;

DETAILED DESCRIPTION

Store-and-forward devices, such as switches and routers, are used in packet networks, such as the Internet, for directing traffic at interconnection points. Store-and-forward devices include a plurality of interface modules, a switch fabric for selectively connecting different interface modules, and a backplane for connecting the interface modules and the switching fabric. The interface modules include receivers (ingress ports) to receive data from and transmitters (egress ports) to transmit data to multiple sources (e.g., computers, other store and forward devices) over multiple communication links (e.g., twisted wire pair, fiber optic, wireless). The sources may be capable of transmitting/receiving data at different speeds, different quality of service, etc. over the different communication links. The interface modules can transmit/receive data using any number of protocols including Asynchronous Transfer Mode (ATM), Internet Protocol (IP), and (Time Division Multiplexing) TDM. The data may be variable length or fixed length blocks, such as cells, packets or frames.

The data received from external sources is stored in a plurality of queues. The queues may be stored in any type of storage device and preferably are a hardware storage device such as semiconductor memory, on-chip memory, off-chip memory, field-programmable gate arrays (FPGAs), random access memory (RAM), or a set of registers. The interface modules may be line cards or chips contained on line cards. A single line card may include a single interface module (receiver or transmitter) or multiple interface modules (receivers, transmitters, or a combination). The interface modules may be Ethernet (e.g., Gigabit, 10 Base T), ATM, Fibre channel, Synchronous Optical Network (SONET), Synchronous Digital Hierarchy (SDH) or various other types. A line card having multiple interface modules may have the same type of interface modules (e.g., ATM) or may contain some combination of different interface module types. The backplane may be electrical or optical.

Figure 1:
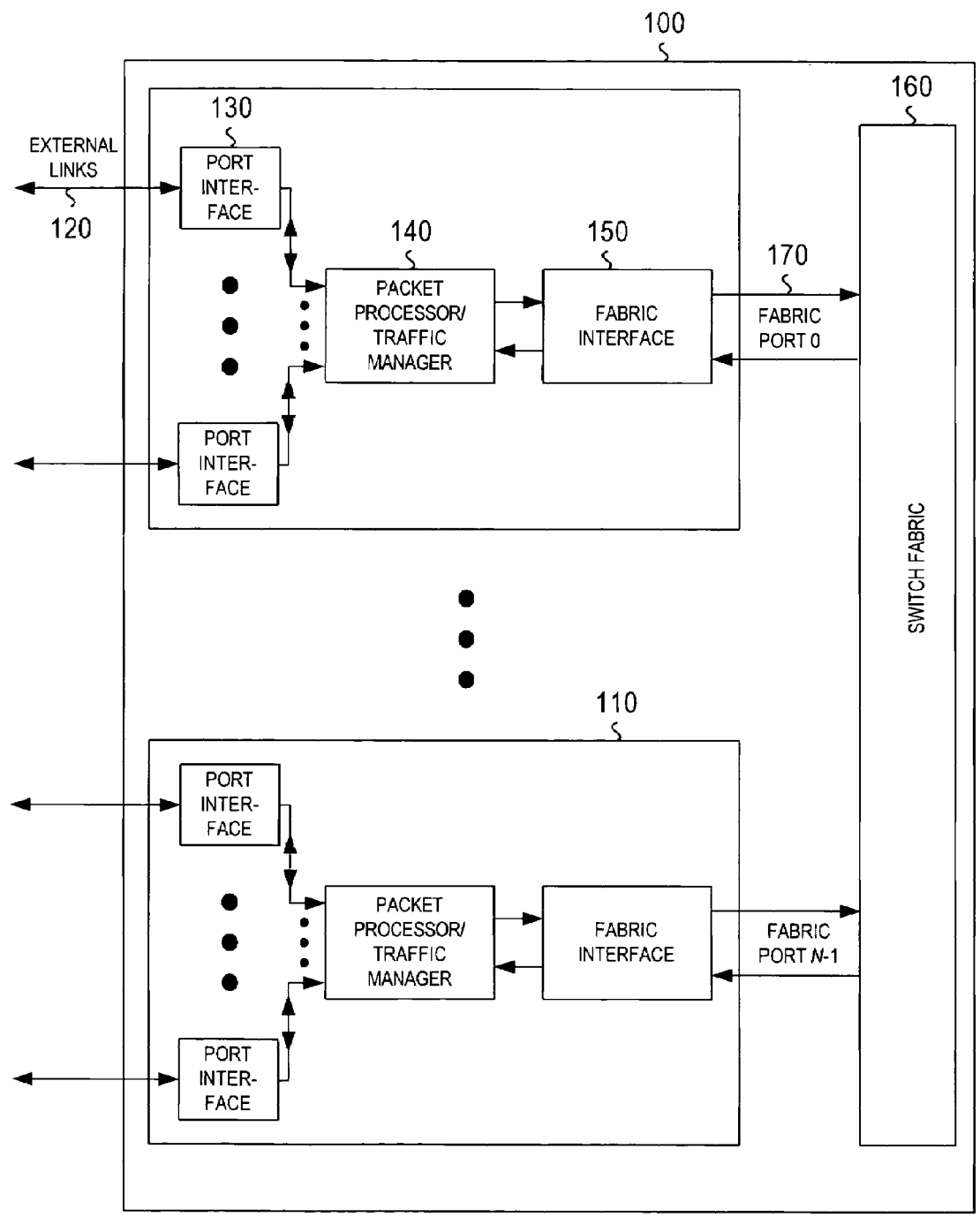
FIG. 1 illustrates an exemplary block diagram of a store-and-forward device, according to one embodiment.

FIG. 1 illustrates an exemplary block diagram of a store-and-forward device 100. The device 100 includes a plurality of line cards 110 that connect to, and receive data from and transfer data to, external links 120. The line cards include port interfaces 130, packet processor and traffic manager devices 140, and fabric interfaces 150. The port interfaces 130 provide the interface between the external links 120 and the line card 110. The port interface 130 may include a framer, a media access controller, or other components required to interface with the external links (not illustrated). The packet processor and traffic manager device 140 receives data from the port interface 130 and provides forwarding, classification, and queuing based on flow (e.g., class of service) associated with the data. The fabric interface 150 provides the interface necessary to connect the line cards 110 to a switch fabric 160. The fabric interface 150 includes an ingress port interface (from the line card 110 to the switch fabric 160) and an egress port interface (from the switch fabric 160 to the line card 110). For simplicity only a single fabric interface 150 is illustrated, however multiple fabric interfaces 150 could be contained on each line card 110.

The switch fabric 160 provides re-configurable data paths between the line cards 110 (or fabric interfaces). The switch fabric 160 includes a plurality of fabric ports 170 (addressable interfaces) for connecting to the line cards 110 (port interfaces). Each fabric port 170 is associated with a fabric interface (pair of ingress fabric interface modules and egress fabric interface modules). The switch fabric 160 can range from a simple bus-based fabric to a fabric based on crossbar (or crosspoint) switching devices. The choice of fabric depends on the design parameters and requirements of the store-and-forward device (e.g., port rate, maximum number of ports, performance requirements, reliability/availability requirements, packaging constraints). Crossbar-based fabrics are the preferred choice for high-performance routers and switches because of their ability to provide high switching throughputs.

It should be noted that a fabric port 170 may aggregate traffic from more than one external port (link) associated with a line card. A pair of ingress and egress fabric interface modules is associated with each fabric port 170. When used herein the term fabric port may refer to an ingress fabric interface module and/or an egress fabric interface module. An ingress fabric interface module may be referred to as a source fabric port, a source port, an ingress fabric port, an ingress port, a fabric port, or an input port. Likewise an egress fabric interface module may be referred to as a destination fabric port, a destination port, an egress fabric port, an egress port, a fabric port, or an output port.

Figure 2:
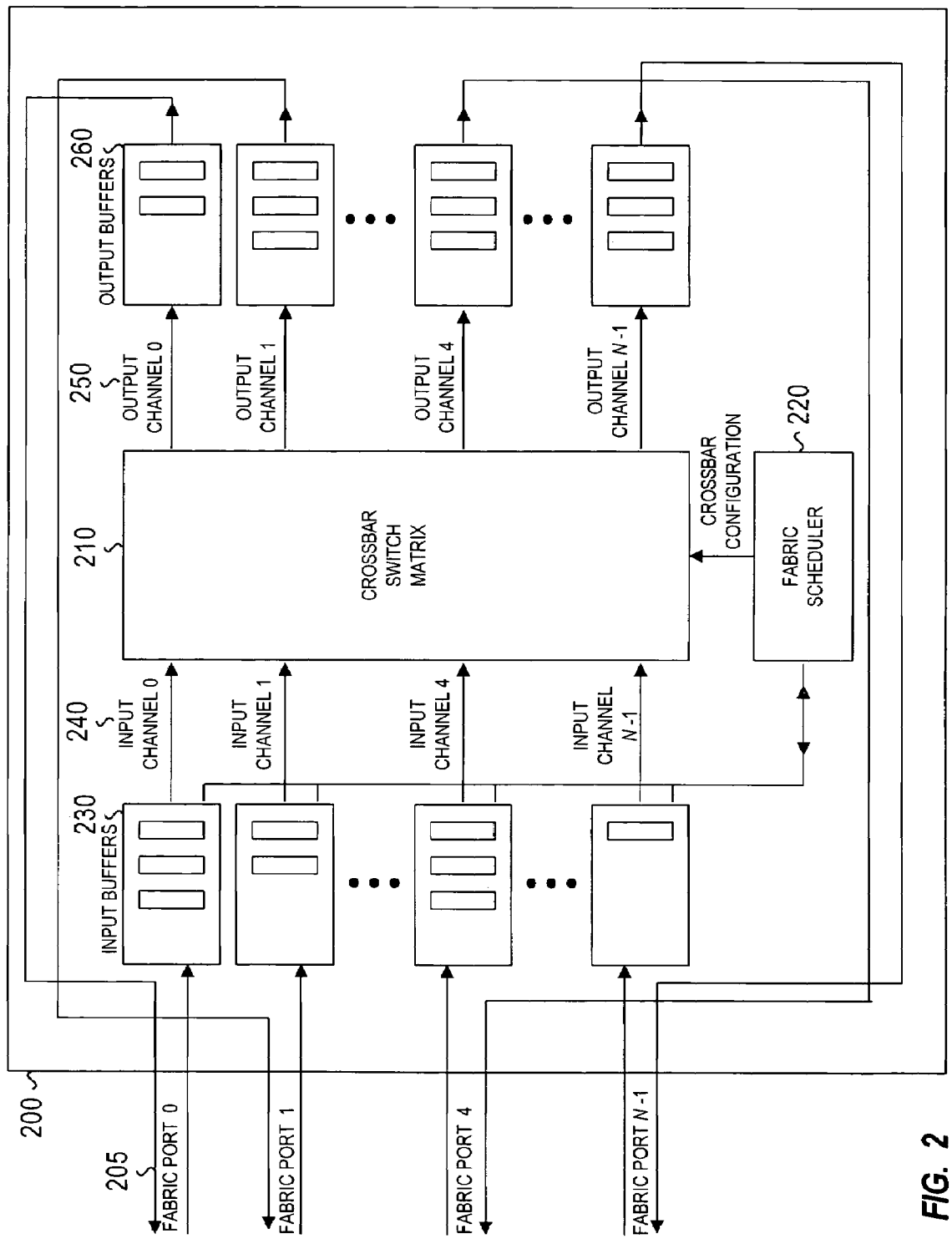
FIG. 2 illustrates an exemplary block diagram of a packet-based packet switch fabric, according to one embodiment.

FIG. 2 illustrates an exemplary block diagram of a packet-based switch fabric 200. The fabric 200 includes a plurality of fabric ports 205 to connect to associated fabric interfaces (ingress/egress pair), a crossbar switching matrix 210, a fabric scheduler 220, input buffers 230 to hold arriving packets from the fabric ports 205, input channels 240 to transmit data from the input buffers 230 to the crossbar matrix 210 (e.g., associated ports), output channels 250 to transmit data from the crossbar matrix 210 (e.g., associated ports), and output buffers 260 to hold packets prior to departing from the fabric ports 205.

A backplane consists of a plurality of channels (input 240 and output 250) that provide connectivity between the fabric ports 205 and the crossbar matrix 210 so as to provide switching connectivity between line cards. With advances in serial communication technologies, the channels 240, 250 are preferably high-speed serial links. High-speed serial data can be carried over either electrical backplanes or optical backplanes. If an optical backplane is used, the transmitting line cards convert electrical signals to optical signals and send the optical signals over fiber, and the destination line cards receive the optical signals from the fiber and reconvert them to electrical signals.

The crossbar matrix 210 is logically organized as an array of N×N switching points, thus enabling any of the packets arriving at any of N input ports to be switched to any of N output ports, where N represents the number of fabric ports. These switching points are configured by the fabric scheduler 220 at packet boundaries. Typically, the packets are switched through the crossbar switching matrix 210 in batches, where a batch consists of at most one packet selected from each input port, in such a way that no more than one of the packets is destined for each output port.

The packets, arriving at one of the input buffers 230, has a header containing the destination port number where it needs to be switched. The fabric scheduler 220 periodically reads the destination port information from the headers of the packets stored in the input buffers 230 and schedules a new batch of packets to be transferred through the crossbar switching matrix 210. The packets in a batch (a maximum of N packets) are transferred in parallel across the crossbar switching matrix 210. While the packets from a scheduled batch are being transferred through the crossbar 210, the scheduler 220 can select the packets to form the next batch, so that the transmission of the new batch of packets can start as soon as transmission of the current batch ends. At the end of the batch of packets, the fabric scheduler 220 re-configures the crossbar switching matrix 210 so as to connect the input ports to the corresponding output ports where its next packet is destined to. Because the packets in the exemplary switching fabric 200 are transferred in batches, the switching paths in the crossbar switching matrix 210 are kept unchanged for the duration of the longest packet being transferred across the crossbar 210 in that batch. For example, when a 50-byte packet and a 1500-byte packet are part of the same batch, the crossbar 210 is maintained in the same configuration for the duration of the 1500-byte packet.

Figure 3:
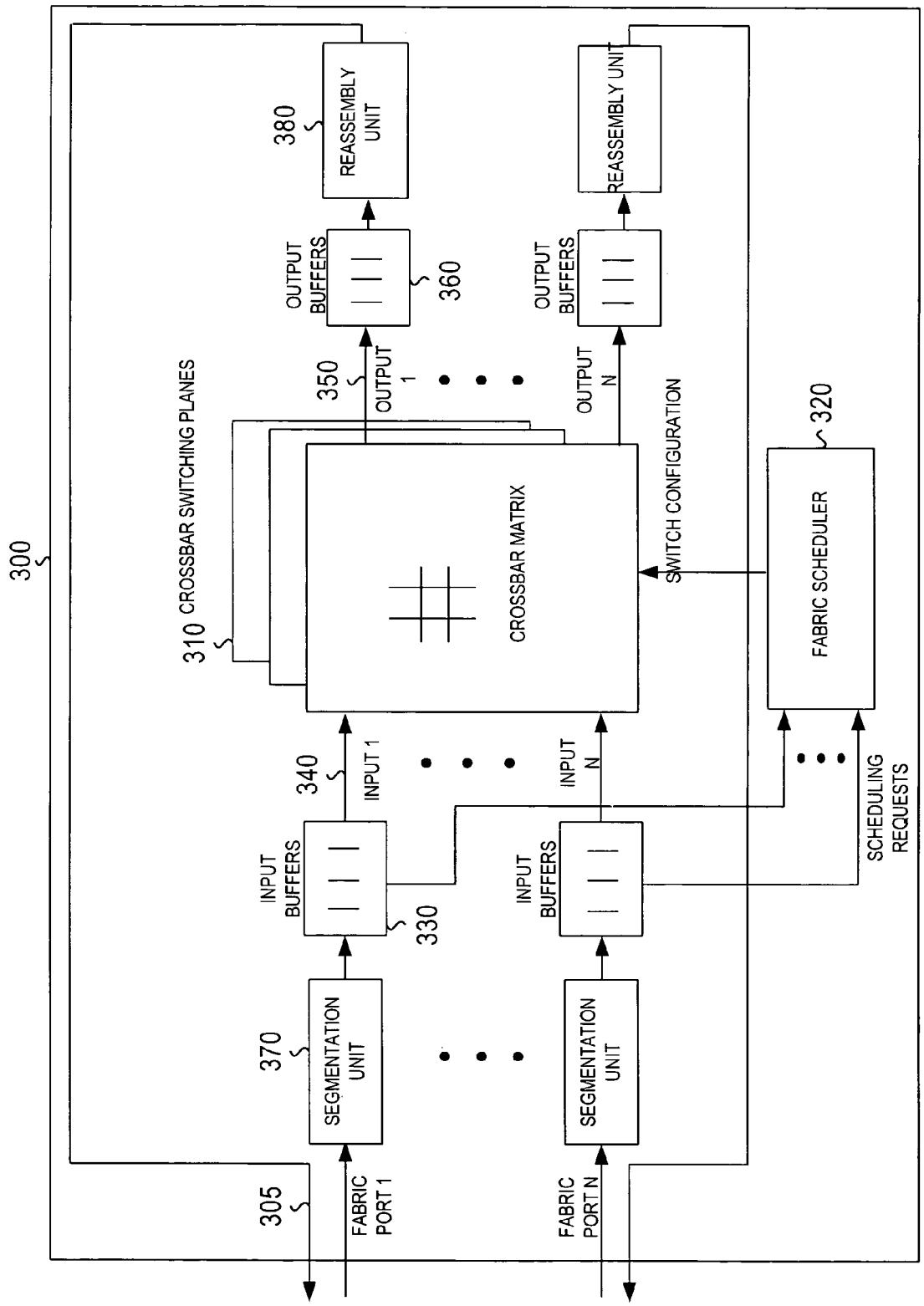
FIG. 3 illustrates an exemplary block diagram of a segment-based switching fabric, according to one embodiment.

FIG. 3 illustrates an exemplary block diagram of a segment-based switching fabric 300. Like the switch fabric 200, the switch fabric 300 includes fabric ports 305, a crossbar switching matrix 310, a fabric scheduler 320, input buffers 330, channels 340, 350 and output buffers 360. In addition, the switch fabric 300 includes segmentation units 370 and reassembly units 380. The segmentation unit 370 divides the packets received at the fabric port 305 into segments (cells) having a fixed size. In addition the segmentation unit 370 adds a header to the segments so that the segments can be identified with one another and put back together. The reassembly unit 380 receives the segments and re-generates the packet based on the segments. The reassembly unit 380 uses the headers to identify which segments are part of the packet.

The fixed size of the segments may be chosen to correspond to the size of the smallest packet switched by the switch fabric 300, plus the size of any internal headers added. For example, if the smallest packet is of size 64 bytes, and the size of the internal headers is 16 bytes, a segment size of 64+16=80 bytes can be chosen. A packet larger than 64 bytes, arriving in the switch fabric 300, will be segmented into multiple segments of maximum size 64 bytes by the segmentation unit 370 before switching through the crossbar matrix 310. If a last segment has less than 64 bytes it is padded to 64 bytes so that the segments are of the same size. These segments is appended with a header (e.g., 16 bytes). After the segments (data and header) are switched through the crossbar matrix 310 they are combined into the original packet by the reassembly unit 380.

The fabric scheduler 320 works in the same way as the fabric scheduler 220 from FIG. 2. The segments arriving at the input buffers has a header containing the port number where it is destined to. The fabric scheduler 320 may select one segment from each input port to form a batch, such that the destination port numbers associated with the segments in the same batch are distinct. The segments within the same batch are then transmitted in parallel. Because the segments are of the same size, no bandwidth is wasted in the crossbar matrix 310. The fabric scheduler 320 determines (schedules) the next batch for transmission during transmission of the current batch. In a high-speed switch, this time interval can be extremely short. For example, with a segment size of 80 bytes and a port rate of 10 Gigabits/second, the fabric scheduler schedules a new batch of segments every 64 nanoseconds ((80 bytes×8 bits/byte)/10 Gbs). The crossbar switching matrix 310 is also configured at intervals of 64 nanoseconds. As the port speed is increased, both the fabric scheduler 320 and the crossbar 310 reconfiguration are made correspondingly faster.

Figure 4:
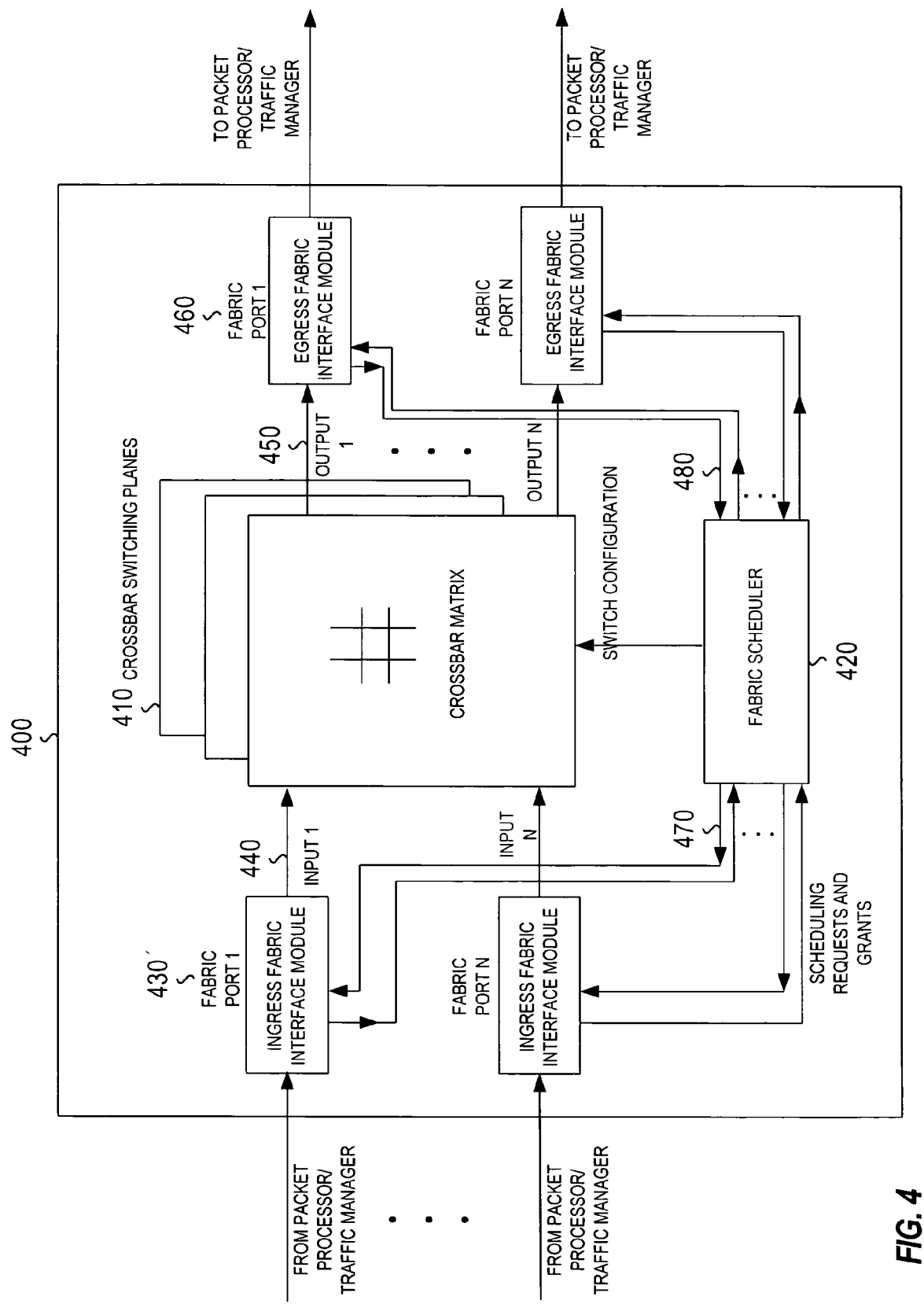
FIG. 4 illustrates an exemplary block diagram of a frame-based switching fabric, according to one embodiment.

FIG. 4 illustrates an exemplary block diagram of a frame-based switching fabric 400. The switching fabric 400 introduces a data aggregation scheme wherein variable-size packets arriving into the store-and-forward device (e.g., router, switch) are first segmented into smaller units (segments) and then aggregated into convenient blocks ("frames") for switching. The switching fabric 400 includes a switching matrix 410 (made up of one or more crossbar switching planes), a fabric scheduler 420, ingress fabric interface modules 430, input data channels 440 (one or more per fabric port), output data channels 450 (one or more per fabric port), egress fabric interface modules 460, ingress scheduling channels 470 and egress scheduling channels 480. According to one embodiment, the data channels 440, 450 are separate from the scheduling channels 470, 480. In an alternate embodiment, the scheduling information can me multiplexed with data and sent over the same physical links, and the scheduler 420 can be integrated with one or more crossbar planes 410 as well. However, the scheduling function remains logically separate from the data path.

The ingress fabric interface module 430 receives packets from the packet processor/traffic manager device on a line card. The packet processor/traffic manager processes the packets arriving from the external links, determines the fabric port number associated with the incoming packet (from a header lookup), and attaches this information to the packet for use by the switching fabric 400. The ingress fabric interface module 430 receives the packets, stores the packets in associated queues, and sends the packets to the switching matrix 410 for transfer to a different line card. The egress fabric interface modules 460 receive packets arriving from the switching matrix 410 (typically from a different line card), and pass them on for any egress processing needed in a line card and subsequently for transmission out on the external links.

The ingress fabric interface modules 430 store the packets arriving from the packet processor/traffic manager in a set of queues. The packets destined to the egress fabric interface modules 460 are maintained in a separate queue (isolated from each other). In addition, the packets destined to a specific egress fabric interface module 460 can further be distributed into multiple queues based on their class of service or relative priority level. These queues may be referred to as virtual output queues. The packets may be broken down into segments and the segments stored in the queues. The segments can be variable size but are limited to a maximum size.

The segments stored in its queues are aggregated into frames by the ingress fabric interface module 430 before transmission to the crossbar matrix 410. The maximum size of the frame is a design parameter. The time taken to transmit the maximum-size frame is referred to as the "frame period." This interval is the same as a scheduling interval (discussed in further detail later). The frame period can be chosen independent of the maximum packet size in the system. Typically, the frame period is chosen such that a frame can carry several maximum-size segments. The frame period is often determined by the reconfiguration time of the crossbar data path. For example, the switching time of certain optical devices are currently of the order of microseconds. If such devices are used for the data path, the frame period is on the order of microseconds. Electronic switching technologies, on the other hand, are significantly faster, allowing frame periods in the range of tens to hundreds of nanoseconds. Another factor that needs to be taken into account while choosing the frame period is the overhead in synchronizing the egress fabric interface modules with the data streams at the start of a frame. Data streams are broken at the end of a frame and the new arriving frame may be from a different ingress fabric interface module (resulting in a change in frequency and/or phase of the clock associated with the data stream). Accordingly, the egress fabric interface modules re-establish synchronization at the boundary of frames.

The ingress fabric interface module constructs a frame by de-queuing one or more segments from its queues when instructed to do so by a grant from the fabric scheduler (discussed in further detail later). A grant may be received by an ingress fabric interface module during each frame period. The grant identifies the subset of queues from which data need to be de-queued based on the destination fabric port (egress fabric port module). This de-queuing of segments proceeds until the frame is full. Because the segments cannot further be broken up, and a frame consists of a whole number of segments, the frames constructed may not have the same size, but will be within the maximum size specified. Alternatively, the frames that do not equal the maximum frame size can be padded to the maximum size so that the frames are the same size.

The fabric scheduler 420 schedules transmissions from the ingress fabric interface modules 430 to the egress fabric interface module 460 via the crossbar matrix 410. The operation of the scheduler 420 is synchronous with respect to a frame clock. That is, the scheduler performs it operations with a clock cycle that is the same as the clock cycle to transmit a frame.

Figure 5:
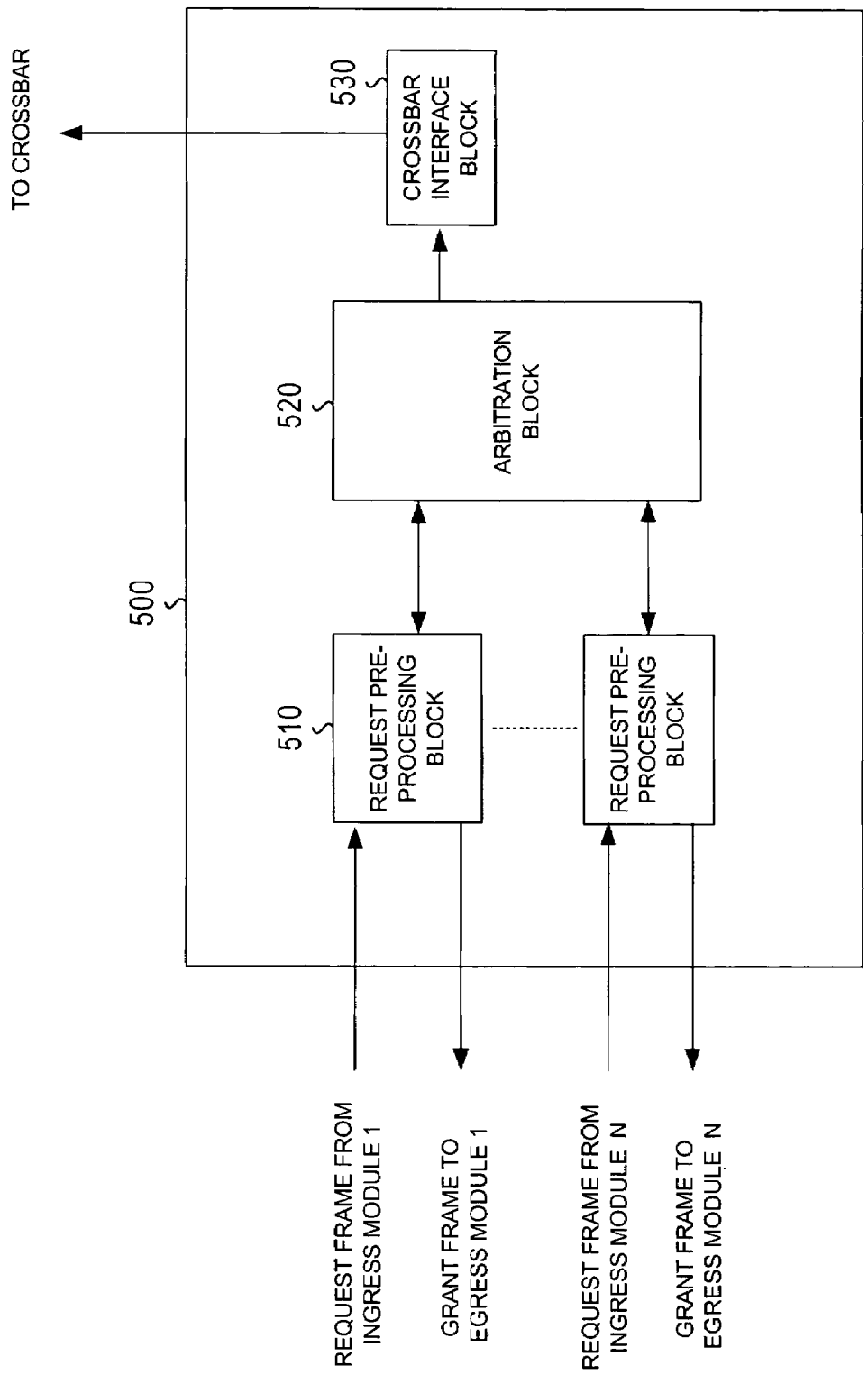
FIG. 5 illustrates an exemplary block diagram of a fabric scheduler, according to one embodiment.

FIG. 5 illustrates an exemplary block diagram of a fabric scheduler 500. The fabric scheduler 500 can be used within any of the packet-based switch fabrics 200, segment-based switch fabrics 300, or frame-based switch fabrics 400. The fabric scheduler 500 includes a plurality of request pre-processing blocks 510, an arbitration block 520, and a crossbar interface block 530. A request frame is received from the ingress fabric interface modules, and the request pre-processing block 510 processes the requests and forwards the requests (including priority levels) to the arbitration block 520. The arbitration block 520 determines matches between the input ports and output ports and generates a schedule based thereon (list of grants indicating which ingress modules will send data to which egress modules). The schedule (grants) is provided to the request pre-processing blocks 510 and the crossbar interface block 530. The request pre-processing blocks 510 send the grant message to the egress fabric interface modules. The crossbar interface block 530 configures the crossbar based on the grants (ingress module to egress module matches).

A basic fabric scheduler implementation may need only the basic information (ID of non-empty queues) to be passed from the ingress fabric interface modules. More powerful scheduler implementations, supporting additional features, require more information to be passed. For example, the information can optionally include many other attributes, such as the amount of data in the queue and the "age" (time interval since a packet was last transmitted) of the queue. In addition, if there are multiple queues associated with each destination port, based on priority or class, then the information may include the amount of data queued at each priority level for each destination port.

Based on the information received from the ingress fabric interface modules, the fabric scheduler computes a schedule for the crossbar planes. The schedule is computed by performing a matching of the requests received from the ingress fabric interface modules and resolving any conflicts therebetween. The scheduler then sets the crossbar matrix (planes) to correspond to this setting. If there are multiple crossbar planes used to stripe the data, then the planes are set in parallel to the same configuration. After the fabric scheduler computes its schedule, the scheduler communicates back to the ingress fabric interface modules the schedule information (grants) computed. The information sent to a particular ingress module includes, at a minimum, the destination fabric port number to which it was matched. Upon receiving this information, the ingress fabric interface modules de-queue data (segments) from the associated queue(s) and transmit the data (frames) to the crossbar data planes (previously discussed). This is done in parallel by the interface modules. Because the fabric scheduler sets the crossbar planes to correspond to the schedule information (grants) communicated to the ingress fabric interface modules, the data transmitted by the ingress modules will reach the intended destination egress interface modules.

While communicating the schedule information (grants) to the ingress fabric interface modules, the fabric scheduler may optionally send information about the computed schedule to the egress fabric interface modules. Specifically, the scheduler may send the egress modules the port number associated with the ingress module that will be transmitting data to it in that cycle. Although this information can be provided within the data stream itself (as part of header), sending it directly from the fabric scheduler enables the egress modules to detect errors by comparing the source of the arriving data (obtained from the headers) with the scheduler-supplied port number. A mismatch indicates an error or failure in the switch fabric system. The arriving data can be discarded in such an event, thus avoiding delivery of data to an unintended port.

The operations of a switch fabric include: communicating schedule requests from the ingress modules to the fabric scheduler (request), the scheduler's computation of a schedule and communicating the results in the form of grants to the ingress interface modules and possibly the egress interface modules (schedule), configuring the crossbar planes to correspond to the computed schedule and de-queuing data from the queues associated with the grants (configure), and the transmission of the data from the ingress modules to the egress modules (transmission). The fabric scheduler is responsible for receiving requests, scheduling/issuing grants, and configuring the crossbar. In a large switch fabric with several fabric ports, the ingress and egress fabric interface modules may be distributed over several line cards and the crossbar data paths may consist of several switching planes located over multiple cards. Configuring a large switch fabric (large number of inputs and outputs) may take several clock cycles. Thus, the overheads associated with the operations of the fabric scheduler (receive request, schedule computation, and crossbar configuration) can be significant. No data can be transmitted until these operations are completed so a large amount of the switch bandwidth can be potentially lost.

Figure 6:
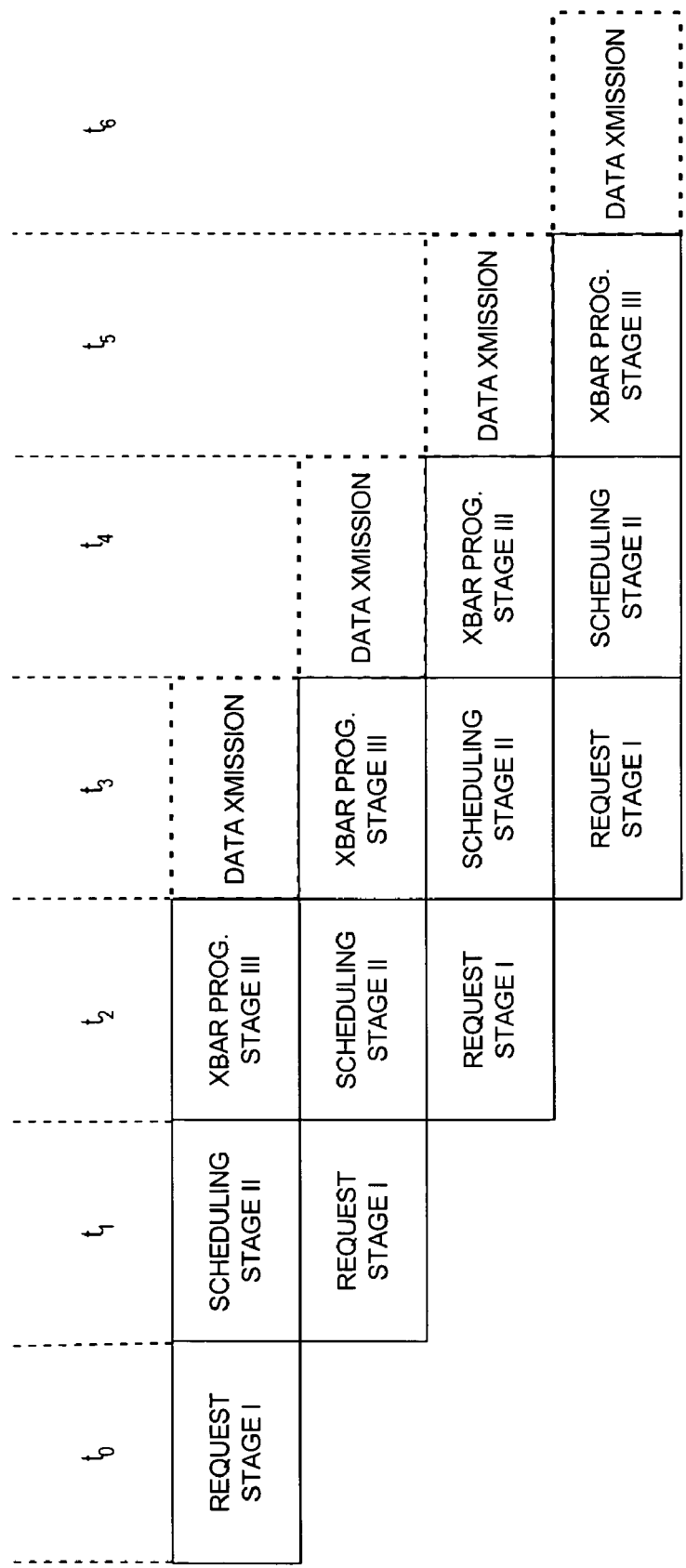
FIG. 6 illustrates an exemplary pipeline schedule for a switch fabric, according to one embodiment.

FIG. 6 illustrates an exemplary pipeline schedule for a switch fabric. The pipeline schedule includes 4 stages. Stage I is the request stage. During this stage, the ingress fabric interface modules send their requests to the fabric scheduler. The scheduler can perform some pre-processing of the requests in this stage while the requests are being received. Stage II is the schedule stage. During this stage, the scheduler matches the inputs (ingress modules) to outputs (egress modules). At the end of this stage, the scheduler sends a grant message to the ingress fabric interface modules specifying the egress modules to which it should be sending data. The scheduler may also send the grants to the egress modules for error detection during this stage (if grants for ingress and egress are transmitted together—discussed in more detail later). Stage III is the crossbar configuration stage. During this stage, the scheduler configures the crossbar planes based on the matches computed during stage II. While the crossbar is being configured, the ingress modules de-queue data from its queues corresponding to the matched egress modules. For a frame-based switch fabric, the ingress modules will form the frames during this stage. The scheduler may also send grants to the egress modules for error detection during this stage. Stage IV is the data transmission stage. During this stage, the ingress modules transmit their data frames across the crossbar.

Each stage occurs during a clock cycle. For packet-based switch fabrics 200 the clock cycle is equivalent to time necessary to transmit longest packet (packet period). For example, if 1500 bytes is the longest possible packet and the port speed was 10 Gbs the packet period is 1.2 microseconds (1500 bytes×8 bits/byte)/10 Gbs=1.2 microseconds). For segment-based switch fabrics 300 the clock cycle is equivalent to the time to transfer a segment (segment period). For example, if the segment size with headers was 80 bytes and the port speed was 10 Gbs the segment period would be 64 nanoseconds ((80 bytes×8 bits/byte)/10 Gbs). For frame based switch fabrics 400 the clock cycle is equivalent to time necessary to transmit the frame (frame period). For example, if the frame size is 3000 bytes with header and the port speed is 10 Gbs the frame period is 2.4 microseconds (3000 bytes×8 bits/byte)/10 Gbs=2.4 microseconds).

Figure 7:
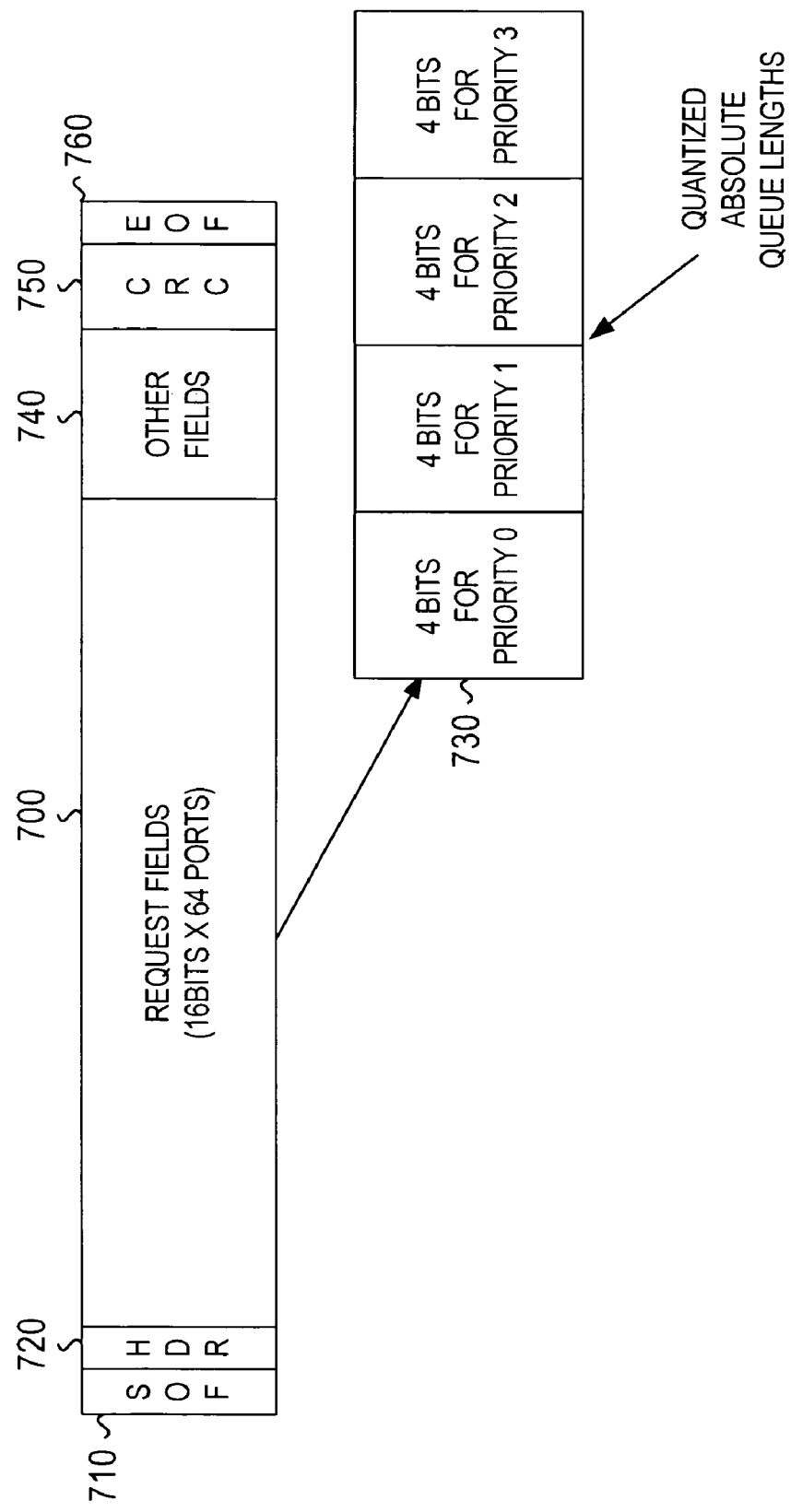
FIG. 7 illustrates an exemplary request frame, according to one embodiment.

The scheduling requests sent from the ingress fabric interface module to the fabric scheduler during each frame period may be formatted as request frames. FIG. 7 illustrates an exemplary request frame 700. The request frame 700 includes a start of frame (SOF) delimiter 710, a header 720, request fields (requests) 730, other fields 740, an error detection/correction field 750, and an end of frame (EOF) delimiter 760. The SOF 710 and EOF 760 fields mark frame boundaries. The header 720 contains a sequence number. The error detection/correction 750 is used to detect transmission errors and may be used to correct errors. According to one embodiment, the error correction/detection 750 is a cyclic redundancy code (CRC). Frames with bad CRC are discarded by the scheduler. Because these requests will automatically be repeated during the following frame periods (discussed in detail below) no retransmission protocol is required. The other fields 740 may be used for functions such as flow control and error control.

The major part of the request frame 700 is the set of requests 730, one for each destination fabric port and priority level. Assuming an example system with 64 fabric ports and 4 priority levels, there would be 256 (64 ports×4 priorities/port) distinct requests 730 in the request frame 700. The request 730 indicates that there is data in an associated queue available for transmission. The request 730 may summarize the amount of data in the associated queue. The length of the requests 730 (e.g., number of bits) may be chosen taking into account limitations on the total length of the request frame 700, and the granularity of the amount of data in the associated queue needed by the scheduler (scheduling algorithms). For example, the requests 730 may be encoded as 4 bits, thus providing 16 different options for defining the amount of data in the queue. That is, the request 730 can utilize 4 bits to describe the amount of data in the queue. The requests 730 can be encoded in various ways to define the amount of data in the associated queue.

The amount of data in the queue may be described in terms of number of bytes, packets, segments or frames. A packet-based switch fabric could define the amount of data in terms of bytes or packets. A segment-based switch fabric could define the amount of data in terms of bytes, packets, or segments. A frame-based switch fabric could define the amount of data in terms of bytes, packets, segments, or frames. According to one embodiment for a frame-based switch fabric, the amount of data is quantized it in terms of the frame period. That is, the request 730 may be encoded to indicate the number of data frames it would take to transport the data within the associated queue over the crossbar planes.

FIG. 8 illustrates an exemplary encoding scheme for quantizing the amount of data based on frames. As illustrated, the scheme identifies the amount of data based on ¼ frames. Since we have a 3-stage scheduler pipeline (request, grant, configure), the length quantization is extended beyond 3 frames to prevent bubbles in the pipeline.

The request 730 may identify the priority of the data in addition to the amount of data. Because the scheduler may use a number of external criteria in making scheduling decisions, such as the amount of data queued at each priority level, the relative priorities of the requests, and the efficiency of the data path (how full the data frames will be), the scheduling process can be extremely difficult. According to one embodiment, the external set of scheduling criteria (priority, amount) is mapped into a set of internal scheduler priority levels (SPL).

FIG. 9A illustrates an exemplary SPL mapping table. For this example, it is again assumed that there are 4 priorities (priority 0-3) associated with each queue and that it is a frame-based switch fabric. For each priority, the mapping table differentiates between full frames and partial frames. A frame can be considered full if there are enough segments for that priority queue or lower priority queues associated with the same destination port. For example, if priority 1 for egress port 7 has ¾ of a frame, and priority 2 has ¼ of a frame, then the priority 1 queue is considered full.

Low priority partial frames will have low SPLs and data within the associated queues may never get scheduled (those requests may be starved). To prevent starvation of these requests (and the data within those queues) "age timers" will be implemented. The scheduler maintains an age timer for the requests so that SPLs for requests that are old can be increased. For ingress modules, the scheduler maintains an N×P age timer value table (where N is the number of egress ports in the system and P is number of external priority levels). The age timer for a particular queue is incremented if the length is non-zero at the end of a scheduling cycle. The timer is reset to zero if data was transmitted in the previous frame period to the egress port and priority level associated with the age timer. A grant-service-bitmap (described later), transmitted from the ingress modules to the fabric scheduler as part of the request frames, indicates that data from a particular priority queue was sent as part of the previous data frame. The aging status may be utilized in the formation of the SPLs.

FIG. 9B illustrates an exemplary SPL mapping table utilizing the aging status of the queue. As illustrated, aged out partial frames are given the same SPL as full frames. For example, if priority 0 data is part of a full frame the scheduler assigns a priority level (SPL) of 0, while the scheduler assigns an SPL of 4 for partial frame priority 0 requests. However, if the partial frame priority 0 request ages out, then the request gets promoted from SPL 4 to SPL 0. In this example, the aging status was simply aged out or not, and aged partial frames were given the same priority as full frames. However, the embodiment is not limited to these examples. In fact, if the SPL had more bits and thus provided more distinct priorities, the aging status could be made more granular (as defined above), more distinctions could be made between aged frames and non-aged frames (e.g., aged full frames given higher SPL than full frames), or some combination thereof.

Figure 10:
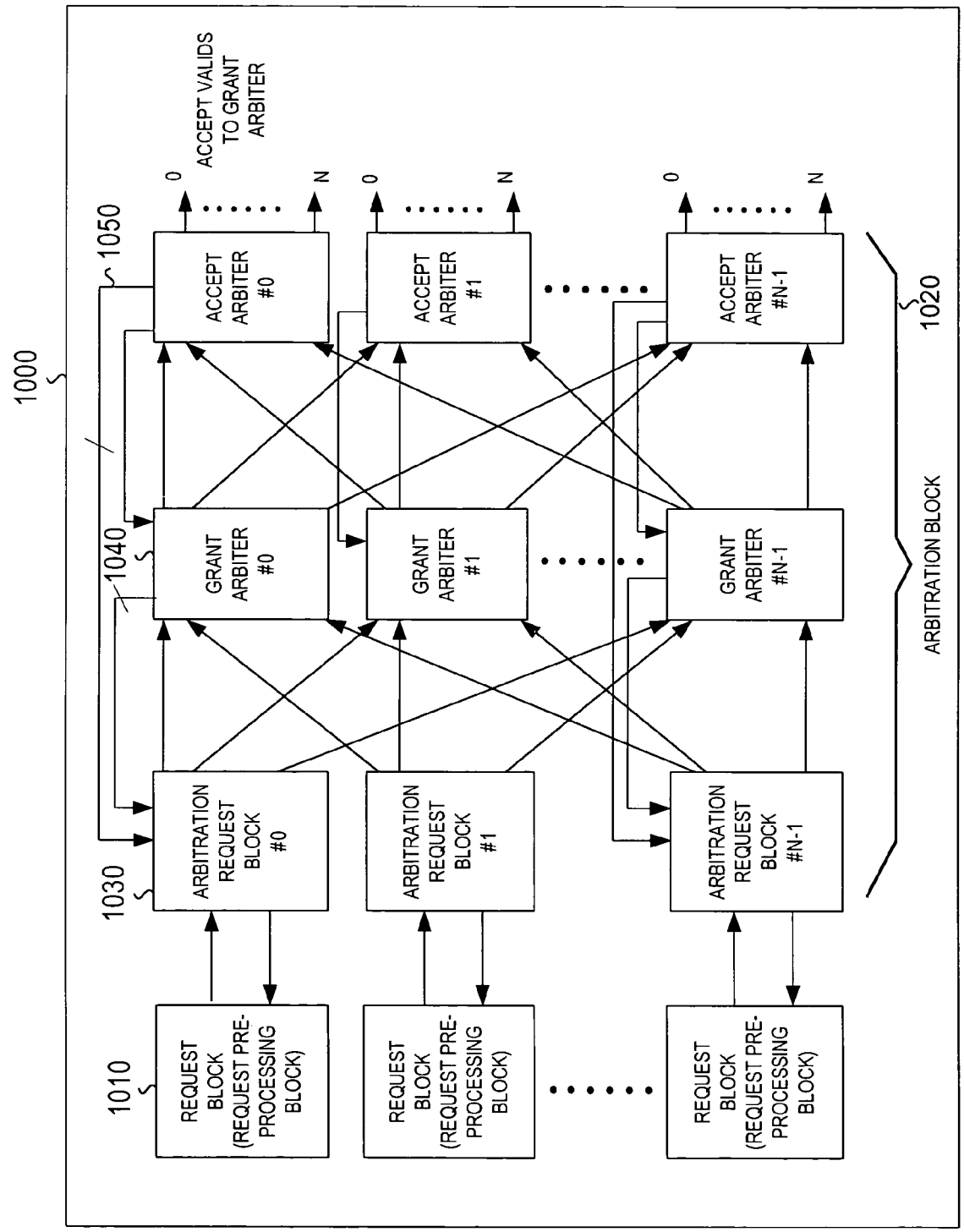
FIG. 10 illustrates an exemplary block diagram of a scheduling engine, according to one embodiment.

FIG. 10 illustrates an exemplary block diagram of a scheduling engine 1000. The scheduling engine 1000 includes request pre-processing blocks 1010 and an arbitration block 1020. The request pre-processing blocks 1010 are associated with specific ingress ports. The request pre-processing block 1010 for a specific ingress port assigns SPLs to the queues based on the external conditions (e.g., priority, aging, fullness) associated with the queues. If there are 64 egress ports and 4 priorities, there are 256 individual requests contained in a request frame received from an ingress port, each request corresponding to a queue associated with the ingress port. Using the example of FIGS. 9A and 9B, the re-quest pre-processing block will assign one of 8 SPLs to each request based on the external conditions.

The arbitration block 1020 generates a switching schedule (ingress port to egress port links) based on the contents of the queues and the SPLs assigned thereto. The arbitration block 1020 includes arbitration request blocks 1030, grant arbiters 1040 and accept arbiters 1050. The arbitration request blocks 1030 are associated with specific ingress modules. The arbitration request block 1030 generates requests (activates associated bit) for those queues having requests for data to be transmitted. The arbitration request block 1030 sends the requests one SPL at a time. That is, the arbitration request block 1030 will send the SPL 0 requests when the arbitration block is set to SPL 0 (discussed in more detail later). For example, if ingress port 0 has SPL 0 data to be transmitted for egress ports 7, 11 and 21 it will send the corresponding requests to the grant arbitrators 1040 associated with egress ports 7, 11 and 21. As the arbitration request blocks 1030 are sending the requests for the same SPL (and thus same priority) there is no need for the requests to include the priority of the data. In fact, according to one embodiment the requests will be nothing more than an active bit (e.g., set to 1) to indicate that there is a request by the associated queue to transmit data. The active bit request is known as a request valid.

The grant arbiters 1040 are associated with specific egress modules. The grant arbiters 1040 are coupled to the arbitration request blocks 1030 and are capable of receiving requests (request valids) from any number (0 to 63 in this example) of the arbitration request blocks 1030. If a grant arbiter 1040 receives multiple requests, the grant arbiter 1040 will accept one of the requests (grant) based on some type of arbitration (e.g., round robin). For example, if ingress module 17 was the last request to be granted for egress module 11, and egress module 11 receives requests from ingress modules 10, 16, 19 and 21, the request for ingress module 19 will be granted as it is the next ingress module after the last processed ingress module. A grant valid corresponding to the request granted will be activated (e.g., set to 1) for the associated ingress port.

The accept arbiters 1050 are associated with specific ingress modules. The accept arbiters 1050 are coupled to the grant arbiters 1040 and are capable of receiving grants (grant valids) from any number (0 to 63 in this example) of the grant arbiters 1040. If an accept arbiter 1050 receives multiple grants, the accept arbiter 1050 will accept one of the grants based on some type of arbitration (e.g., round robin). For example, if egress module 19 was the last grant to be accepted for ingress module 1, and ingress module 1 receives grants for egress modules 16, 18 and 21, the grant for egress module 21 will be accepted as it is the next egress module after the last processed egress module. An accept valid corresponding to the grant accepted will be activated (e.g., set to 1) for the associated egress port. If any accept arbiter 1050 accepts a grant, the arbitration request block 1030 associated with that ingress port is disabled for the remainder of the scheduling cycle. Likewise, if a grant is accepted for a certain grant arbiter 1040, the grant arbiter is disabled for the remainder of the scheduling cycle.

Each iteration of the scheduling process consists of the three phases: requests generated, requests granted, and grants accepted. At the end of an iteration the process continues for ingress and egress ports that were not previously associated with an accepted grant. The scheduler also includes an iteration manager (not illustrated in FIG. 10). The iteration manager is a central block within the scheduling engine that keeps track of the SPL for which the iterations are being performed. As previously mentioned, the scheduler processes requests one SPL at a time. The maximum number of iterations that can be performed is a design parameter that depends on the clock cycle time and other details. The iteration manager allows these iterations to be distributed among the different SPLs in a flexible manner, so that any unneeded iterations at a certain SPL can be accumulated and carried over to the next level. This is achieved by programming a table. The table contains, for each SPL, the maximum number of cumulative iterations allowed for all the SPLs up to and including that level.

FIG. 11 illustrates an exemplary SPL iteration table. For each SPL, the table includes the number of iterations and the maximum allowed cumulative number of iterations (programmed value). For example, the number of iterations for SPL 0 is 3 and the maximum cumulative number of iterations is also 3. The number of iterations associated with SPL 1 is 2 and the cumulative number of iterations is 5, and so on. Once iterations for one SPL are completed, the unmatched requests at that SPL are carried over to the next lower SPL and treated at the same priority level as the requests in this lower SPL. For example, if three iterations were complete for SPL 0 but ingress port 2 still had an SPL 0 request for egress port 7, that request would be treated like the SPL 1 requests. In effect, the SPL for this request is increased (priority decreased) to match the SPLs of the requests to be processed in the next iteration.

In addition, unused iterations from one SPL are carried over to the next SPL. That is, if three iterations are dedicated for requests at SPL 0, but in iteration 1 it is determined that there are no requests at SPL 0, then the remaining two iterations could be used by requests at SPL 1. Thus, SPL 1 could utilize up to four iterations to grant valid requests for as many ingress to egress matches as possible. This iterative matching scheme (permitting rollover of SPLs) is referred to as Iterations Carried Over Next priority (ICON). The programmed value (maximum cumulative iteration) from FIG. 11 helps in the implementation of iteration carry over. The iteration manager knows that until the iteration counter reaches the programmed value that the iterations can continue for a particular SPL. For example, SPL 1 arbitration continues until 5 iterations have been completed. Thus, if during iteration number 2 for SPL 0 it is determined that no new grants can be given, then the iteration manager increments the SPL to 1. Now SPL 1 arbitration can proceed from iteration number 3 to 5.

The iteration manager can increment the SPL if (1) the number of iterations dedicated for that SPL is completed, or (2) the grant arbiters indicate that no new grants can be given (either because the grant arbiters did not receive any requests, or they are already matched). It should be noted that it will take at least one iteration to determine that no new grants can be issued (no matching can be done).

According to one embodiment, the arbitration used by the grant arbiters 1140 and the accept arbiters 1150 is a round robin arbitration. Accordingly, the grant arbiters 1140 and the accept arbiters 1150 incorporate a round-robin pointer for each SPL. The pointers associated with the grant arbiters 1140 are used to select a winning request at an associated SPL during the current iteration. The pointers associated with the accept arbiters 1150 are used to accept a winning grant at an associated SPL during the current iteration. Thus, when there are four internal priority levels SPL 0-3, there are four round-robin pointers within the grant arbiters 1140 and within the accept arbiters 1150. During each iteration, the round-robin pointer in the grant arbiter 1140 corresponding to the SPL associated with that iteration is used to select the winning request. For example, if the current iteration being performed is for SPL-0 requests, the grant arbiters 1140 will use the round-robin pointer 0 for selection of the ingress port to grant to. If the round-robin pointer 0 in the grant arbiter associated with port 5 is currently pointing to 12, and if there are active SPL-0 requests from ingress ports 5, 7, 12 and 21, the grant arbiter will select 12 as the egress port to send the grant (the first active request starting from its current setting 12). The round-robin pointers in the accept arbiters are used in the same way to select one of the grants received from the grant arbiters.

After the iterations have been completed, the scheduler performs a pointer update operation during which the round-robin pointers in the grant arbiters 1140 and the accept arbiters 1150 are updated as follows: If the request pointed by the round-robin pointer for a specific SPL in a grant arbiter 1140 was matched successfully, (that is, the request was satisfied on completion of the iterations), then the round-robin pointer is updated to the next valid request (in round-robin order), considering the valid requests at that SPL and higher SPLs. In the above example, if the request from ingress port 12 was satisfied, the round-robin pointer 0 in the grant arbiter will be updated to 21, the ingress port number corresponding to the next valid request at SPL-0. If, on the other hand, the grant to ingress port 12 was not accepted, the round-robin pointer for SPL-0 in the grant arbiter is not modified (so that the grant arbiter will again select the request from ingress port 12 in the next scheduling cycle, during an iteration at SPL-0).

In a more complex example, assume that the round-robin pointer for SPL-1 in a grant arbiter 0 is pointing to port 12, and that the current iteration is being performed at the SPL-1 priority level. Assume that there are active SPL-1 requests for egress port 0 from ingress ports 5, 12, 17 and 21 during the current iteration; and that there are unmatched SPL-0 requests from ingress ports 6, 16, 19 and 25, which are also submitted during the current iteration. Also assume that the scheduler was able to satisfy the SPL-1 request from port 12. Then during the pointer update operation, the round-robin pointer for SPL-1 is updated to 16, the port number corresponding to the next valid request, considering both SPL-0 and SPL-1 requests submitted during the iteration The round-robin pointers in the accept arbiters 1150 are updated during the pointer update operation in a similar manner, except that, while updating a round-robin pointer associated with a port i, only the requests originating from the ingress port i are considered. Thus, if the request pointed by the round-robin pointer for a specific SPL in an accept arbiter i was matched successfully, then the round-robin pointer is updated to the next valid request (in round-robin order), considering the valid requests from ingress port i at that SPL and higher SPLs. For example, assume that there are active SPL-0 requests from ingress port 0 for egress ports 5, 12, 17 and 21; and active SPL-1 requests for egress ports 6, 15, 19 and 25. Also assume that the current iteration is at SPL-1, during which the scheduler was able to satisfy the SPL-1 request to egress port 15. Then during the pointer update operation, the round-robin pointer for SPL-1 is updated to 17, the port number corresponding to the next valid request, considering both SPL-0 and SPL-1 requests. In one embodiment, the pointer updates will be performed considering the request that was satisfied was for a full frame of data or less than a frame at a single priority level. If the request that was satisfied was for less than a full frame of data, then the lower-priority requests for the same pair of ingress-egress ports may also be satisfied by the same grant, so that the pointers for the corresponding SPLs can be updated as if their requests were satisfied. The arbitration request block 1130 uses the SPLs in two different ways depending on whether the scheduler is arbitrating (scheduling phase) or updating the pointers (pointer update phase). During the scheduling phase, the arbitration request block 1130 sends out the requests for the SPL at which the arbitration is currently processing, as well as the requests remaining unmatched at lower SPLs (higher priorities). For example, if SPL 2 is the current level of the iteration, then unmatched SPL 0, SPL 1, SPL 2 requests are sent out for arbitration. During the pointer update phase, the grant and accept arbiters update their per-SPL round-robin pointers one SPL at a time. Therefore, the arbitration request block 1130 sends out only requests of the SPL that is currently being processed.

As previously mentioned, a grant is formed by the scheduler at the end of the scheduling cycle for transmission to the ingress ports and the egress ports. The grant is sent by the fabric scheduler in a grant frame similar to the request frame it receives from the ingress fabric interface modules. The grant to the ingress module identifies which egress module it should send data to. The ingress module knows which queues are associated with the egress module and thus can form the data frame from those queues. According to one embodiment, the segments used to create the data frame are selected from the highest priority queues first (e.g., priority 0). If the highest priority queue does not have enough segments or has no data, the ingress module moves to the next priority queue to generate the frame. Once the frame is full, and the crossbar is configured, the frame is transmitted to the switching fabric. Starting with the highest priority queues may cause some queues to starve (have segments that are not sent for long periods of time). As previously discussed, the scheduler may take account of the age of the data within the queues in the formation of the SPLs (e.g., partial aged frame is given same SPL as full frame) and thus the selection of requests for that arbitration request block (ingress module). However, if the scheduler selects a request from a particular ingress module for a particular egress module based on a lower level priority, the particular ingress module may have received higher level data prior to the dequeuing of data from queues associated with the particular egress port. Accordingly, the higher priority queue will be used to form the frames and the lower priority queue may again not be serviced.

According to one embodiment, the grant for the ingress module may include the priority as well as the egress module. When the priority level is identified, the ingress module will start dequeuing data from the identified priority queue first. Starting from a specific priority level would prevent the lower priority queues from starving (not being transmitted for a long time). The priority may be included all of the time, or only when the age timers indicate that the data in the queue is starving or is soon to be starving (e.g., has exceeded some time threshold).

The grant message to the ingress module is sent out at the end of the scheduling/grant frame (stage II), so as to give the scheduler enough time to compute the matching. That is, the scheduler can start transmitting the grant frame while it is still working on the computation of the matching, and the result is needed only close to the end of the frame time. This avoids an additional frame time worth of delay in the scheduling pipeline.

The grant frame to the egress module identifies the ingress module that will be transmitting data to the egress module. The egress module can compare the frame received from the crossbar with the grant to determine if the correct data was sent. A mismatch in the frame received and the grant indicates some type of error in transmission and results in discarding of the frame.

Figure 12:
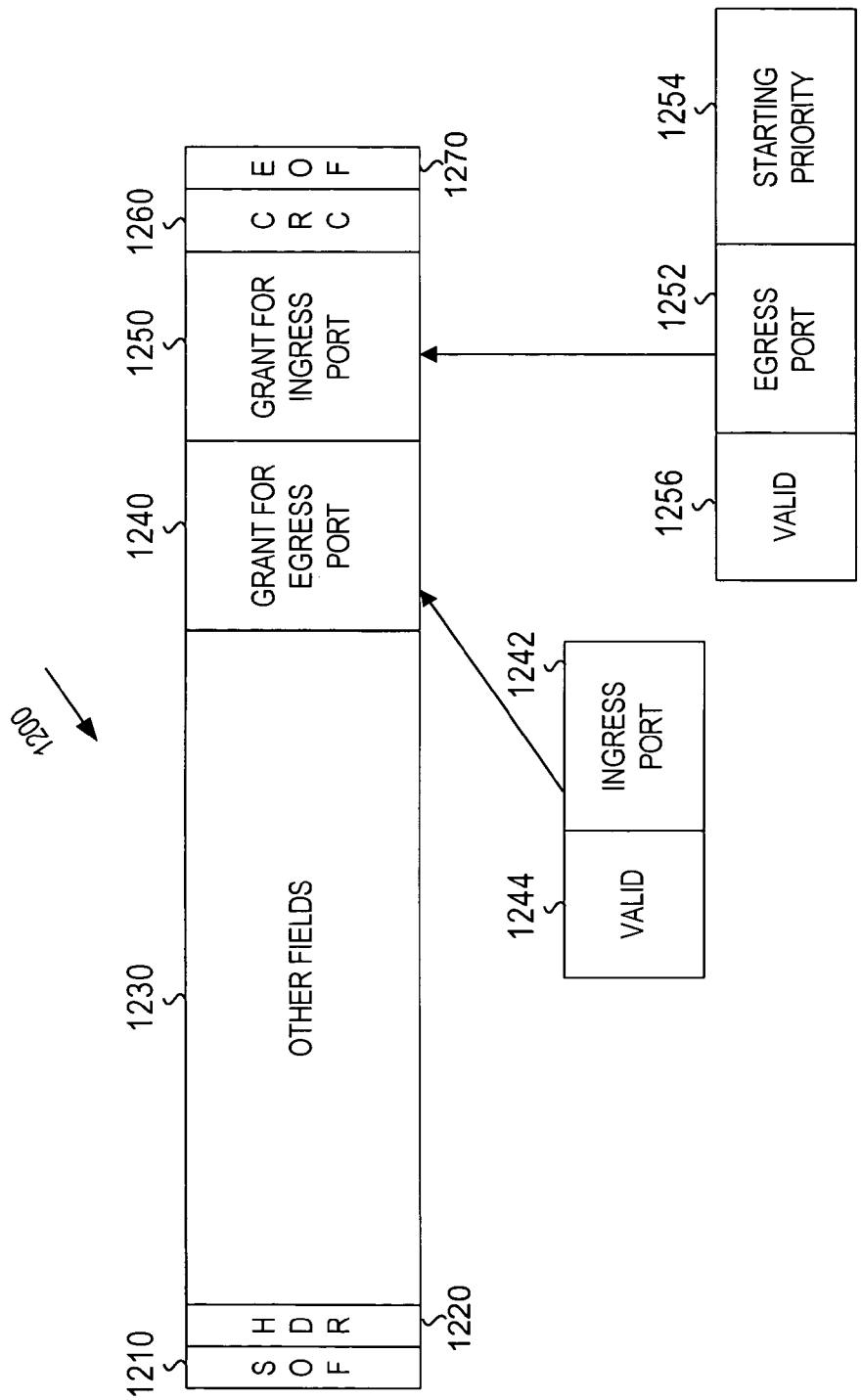
FIG. 12 illustrates an exemplary grant frame, according to one embodiment.

If both the ingress and egress modules associated with the same fabric port are packaged together (e.g., in the same chip or board), the two grant messages could be combined into a single grant frame. FIG. 12 illustrates an exemplary grant frame 1200, combining the messages to ingress and egress fabric interface modules associated with a fabric port. The grant frame 1200 includes a start of frame (SOF) delimiter 1210, a frame header 1220, other fields 1230, an egress module grant 1240, an ingress module grant 1250, an error detection/correction field 1260, and an end of frame (EOF) delimiter 1270. The other fields 1230 can be used for communicating other information to the ingress and egress modules, such as flow control status. The egress module grant

1240 may include an ingress module (input port) number 1242 representing the ingress module it should be receiving data from, and a valid bit 1244 to indicate that the field is valid. The ingress module grant 1250 may include an egress module (output port) number 1252 representing the egress module to which data should be sent, a starting priority level 1254 representing the priority level of the queue that should be used at least as a starting point for de-queuing data to form the frame, and a valid bit 1256 to indicate that the information is a valid grant. The presence of the starting priority field enables the scheduler to force the ingress module to start de-queuing data from a lower priority queue when a higher-priority queue has data. This allows the system to prevent starvation of lower-priority data. The error detection/correction field 1260 (e.g., a Cyclic Redundancy Code (CRC)) is used to detect errors in the grant frame.

If the grant includes the priority, the ingress module should start de-queuing data at the given priority. However, data from other priority levels may be sent as part of the same frame if the specified priority level does not have a full frame of data. It is important for the fabric scheduler to receive information from the ingress module on which priorities were actually serviced while sending the frame. This information is sent back from the ingress module to the fabric scheduler as a grant service bitmap.

FIG. 13 illustrates an exemplary grant service bitmap. The grant service bitmap includes one bit for each priority level. If segments from that priority were part of the data frame that was sent during the last frame time the associated bit is active (set to 1). For example, if a frame contains priority 0 and priority 2 segments, the grant service bitmap will set the bits corresponding to priority 0 and priority 2 active (as illustrated). According to one embodiment the grant service bitmap is contained within a request frame.

The bitmap corresponds to the grant that was last serviced by the ingress module. For example, if scheduler sends a grant in Frame 3, the ingress module de-queues segments and forms a data frame during frame period 4, and the ingress module sends the grant service bitmap to the scheduler in frame period 5. When the scheduler receives the bit map having bits 0 and 2 active it knows that segments of priority 0 and priority 2 were part of the data frame sent during the last frame time. Once the scheduler determines that segments were transmitted for a particular queue, the age timer is reset for that queue. If the queue was considered aged and accordingly was given a higher SPL, the SPL will be lowered as the queue will not be considered aged anymore (age timer reset).

Figure 14:
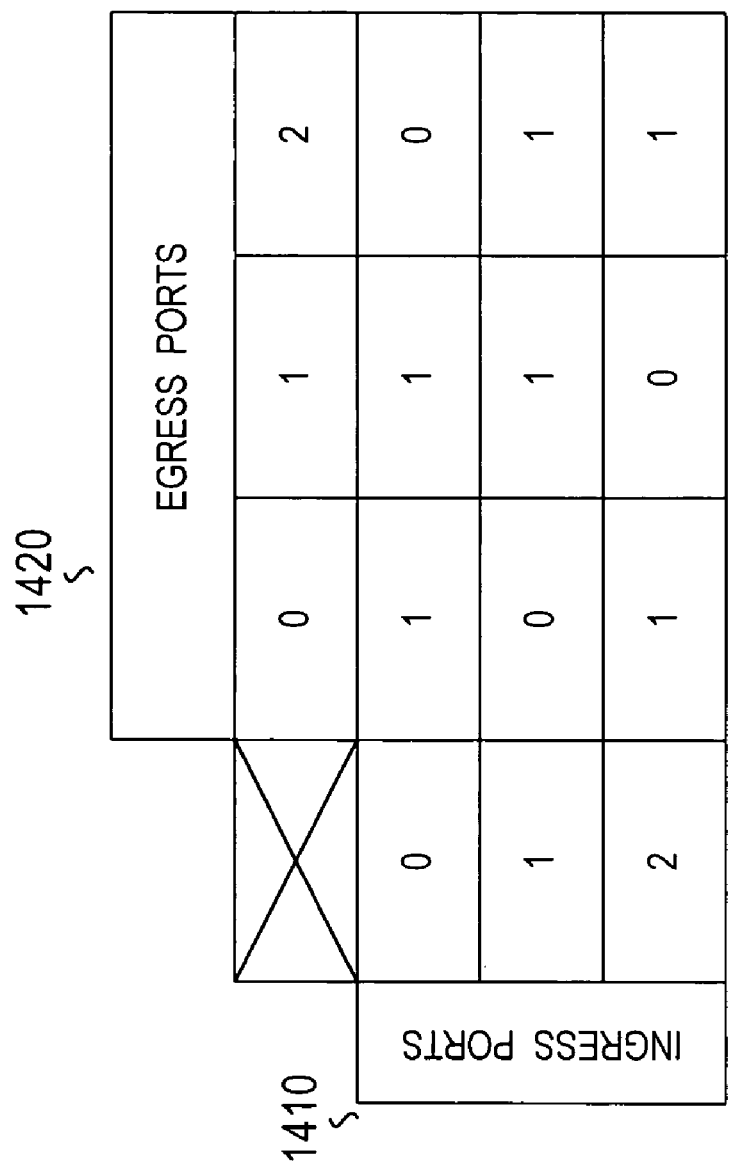
FIG. 14 illustrates an exemplary table of requests for three fabric ports, according to one embodiment.

The ideal operation of the scheduler would be to match the requests in the most efficient manner taking the least possible time. That is, the scheduler should attempt to find the maximum number of matches in each iteration so that it would take the least amount of time to process the requests. However, there are specific patterns of requests from ports for which it is especially difficult to compute efficient schedules. For example, consider three ingress ports and three egress ports such that each ingress port had two requests and each egress port had two requests. FIG. 14 illustrates an exemplary table of requests for three fabric ports. As illustrated there are a total of six requests. Each ingress port (ports 0-2) 1410 is requesting to transmit data to two egress ports 1420, and each egress port (ports 0-2) has requests from two ingress ports 1410 that want to transmit data thereto. For example, ingress port 1 has requests for egress ports 1 and 2. Egress port 0 is receiving requests from ingress ports 0 and 2. In an ideal operation, assuming that no additional requests were received, the scheduler would schedule three requests in one frame and the other three requests in the next frame. For example, in frame 0 the scheduler would schedule the following requests: ingress port 0 to egress port 0, ingress port 1 to egress port 1, and ingress port 2 to egress port 2. In frame 1, the scheduler would schedule the remaining requests: ingress port 0 to egress port 1, ingress 1 to egress 2, and ingress 2 to egress 0.

However, there is no guarantee that the scheduler can reach this ideal condition. In fact the arbiters may get themselves in a locked state where the matches repeat themselves. For example, in the above example of FIG. 14, the scheduler may schedule two requests at a time and take 3 frames to schedule the six requests. For example, the scheduler may schedule in frame 0 ingress 2 to egress 0 and ingress 1 to egress 1, in frame 1 ingress 0 to egress 0, and ingress 2 to egress 2, and frame 2 ingress 0 to egress 1 and ingress 1 to egress 2. The round-robin arbiters in this case are in a state where only two out of three matches occur. Thus, the matching algorithm is providing only 66% throughput. The scheduler will only enter this state if the requests remain at the same priority level. If a request changes priority levels, the arbiters may come out of this locked state.

Figure 15:
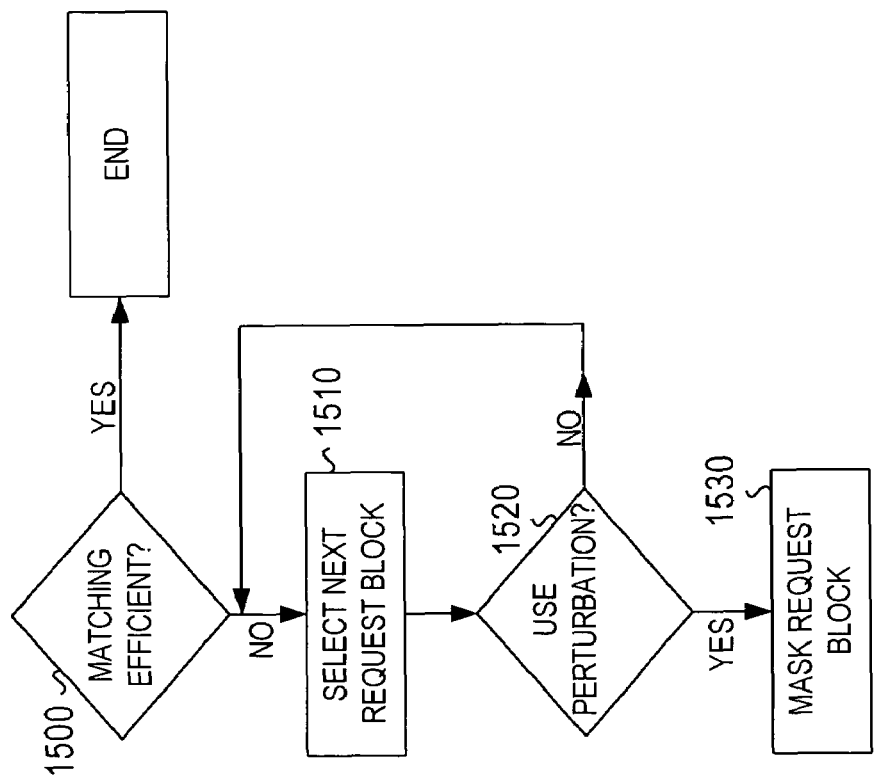
FIG. 15 illustrates an exemplary pointer perturbation process, according to one embodiment.

The pointer perturbation is performed periodically on detecting a sustained inefficiency in the matchings computed by the scheduler. Pointer perturbation helps introduce some randomness in the algorithm and helps the otherwise deterministic matching algorithm to give better matches. FIG. 15 illustrates an exemplary pointer perturbation process. As pointer perturbation is only performed if the scheduler is not obtaining 100% efficiency (e.g., all the requesting input ports and/or all the requested output ports are not matched). A determination as to whether matching is efficient or not is done periodically 1500 (discussed in more detail with respect to FIG. 16). If the matching is found to be inefficient (1500 No), then one of the request blocks is selected to cause perturbation 1510. According to one embodiment, the request blocks are selected based on a round-robin selection.

Figure 17:
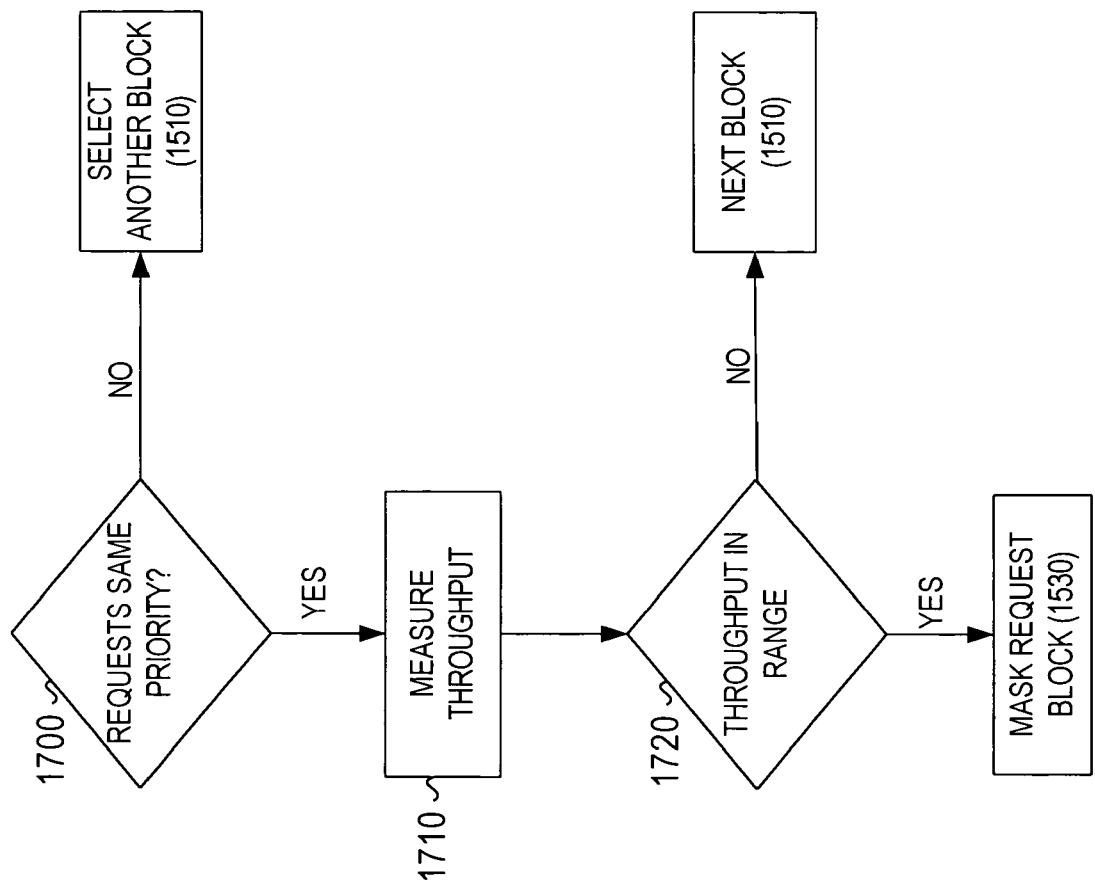
FIG. 17 illustrates an exemplary process for measuring throughput of the selected request block, according to one embodiment.

After the block is selected 1510, a determination is made as to whether the selected request block can use perturbation 1520 (discussed in more detail with respect to FIG. 17). If the determination is made that the request block can use perturbation (1520 Yes), then the request block is masked out 1530 during the pointer update phase so that the grant arbiters do not receive requests from this request block. This masking of the request block 1530 will mean that the grant arbiters receive a different (e.g., smaller) set of requests including some of the arbiters that were pointing to the requests from the perturbing request block. This causes a disturbance in the pointers and any locked state gets broken.

If the determination is made that the request block does not need perturbation (1520 No), a next request block is selected 1510. The pointer attribution process can be repeated at a regular frequency (e.g. every 64 frames). That is, every 64 frames, a determination will be made as to whether scheduling is efficient 1500.

Figure 16:
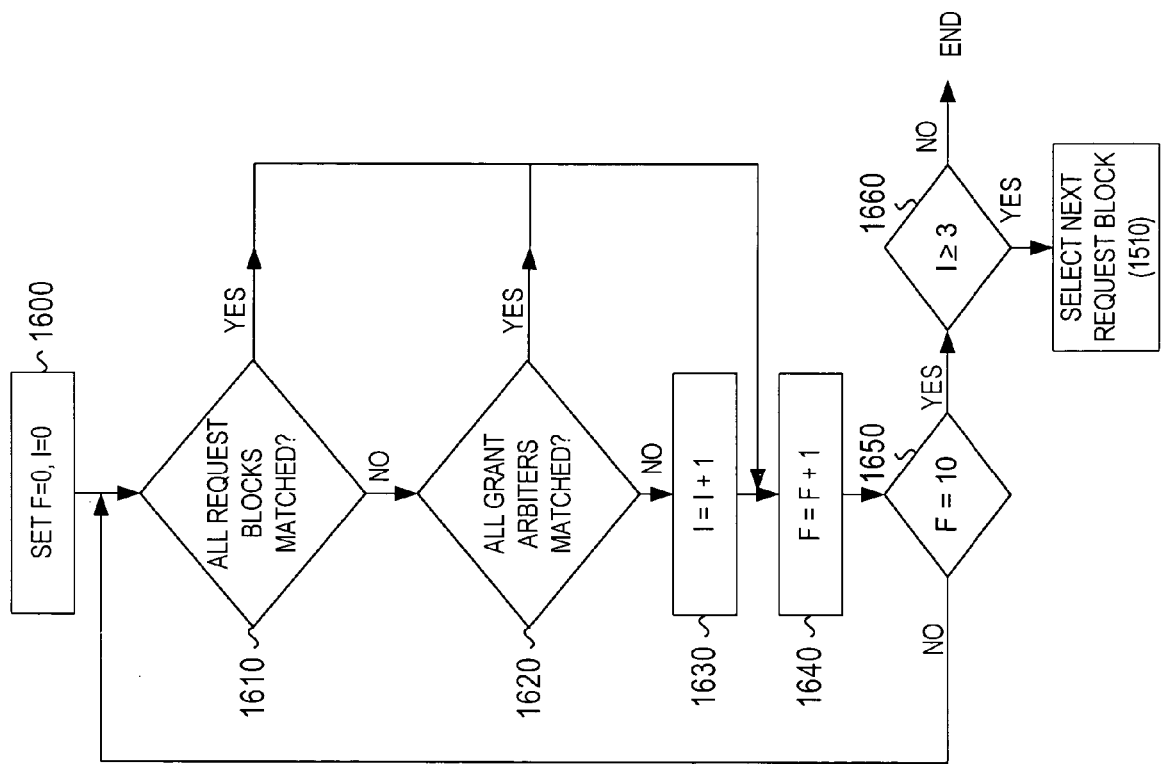
FIG. 16 illustrates an exemplary method for determining if the scheduling is efficient, according to one embodiment.

FIG. 16 illustrates an exemplary method for determining if the scheduling is efficient. Initially, a frame counter F and an inefficiency counter I are set to zero (F=0, I=0) 1600. A determination is made as to whether all the request blocks that sent out requests have been matched (e.g., is request efficiency 100%) for the frame period 1610. If all the requests blocks had requests granted during the frame (e.g., the frame was 100% request efficient—1610 yes), the frame count is incremented by 1 (F=F+1) 1640. If all the request blocks did not have requests granted during the frame (e.g., the frame was not 100% request efficient—1610 No), then a determination is made as to whether all the grant arbiters that received request were matched (e.g., is grant efficiency 100%) for the frame period 1620. If all the grant arbiters had grants accepted during the frame (e.g., the frame was 100% grant efficient—1620 yes), the frame count is incremented by 1 (F=F+1) 1640. If all the request blocks did not have grants accepted during the frame (e.g., the frame was not 100% grant efficient—1620 No), then inefficiency count is incremented by 1 (I=I+1) 1630. After, the inefficiency count is incremented 1630 the frame count is incremented 1640. A determination is then made, as to whether the frame just processed and monitored was a predefined frame (e.g., the tenth frame) 1650. If it is not the $10^{th}$ frame that has been monitored (1650 No), then the process starts again for the next frame. If the frame was the $10^{th}$ frame (1650 Yes), a determination is made as to whether some percentage of the monitored frames were inefficient (e.g., at least 30%, at least 3) 1660. If the inefficiency count is less than 3 (1660 No), the process ends. If the counter is greater than or equal to 3 (1660 Yes) the process proceeds to selecting a request block for perturbation (e.g., 1510 of FIG. 15).

FIG. 17 illustrates an exemplary process for measuring throughput of the selected request block (e.g., can this block use perturbation). Initially a determination is made as to whether the requests from this request block have been at the same priority for some defined number of frames (e.g., the past 16 frames) 1700. If the requests have not been the same priority (1700 No) for the past 16 frames, then another request block is selected (e.g., 1510 of FIG. 15). If the requests were the same priority (1700 Yes), then the grant throughput for the associated input port is measured 1710. Measuring the throughput includes determining number of grants the input port received during the past predetermined number (e.g. 16) of frames. A determination is then made as to whether the number of grants falls within an acceptable range for performing perturbation (e.g., between 8 and 14) 1720. If the number of grants received by the input port is greater than 8 but less than 14 (1720 Yes) then the request block agrees to perturb the pointers (e.g., 1530 of FIG. 15). If the number of grants received is less than 8 or greater than 14 (1720 No) then the next request block is selected (e.g., 1510 of FIG. 15). If less than 8 grants were received, the request block is operating at 50% or less matching so no perturbation is performed to avoid causing more suffering to that input port. If number of grants received is 15 or 16, then no perturbation is performed on that request block as the input port is getting good matching.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A scheduling device comprising a plurality of ingress ports to receive data from external sources;

a plurality of egress ports to transmit data to external destinations;

a plurality of queues to store data waiting to be transmitted, wherein the queues are associated with a particular ingress port and a particular egress port;

a request generator to generate requests for permission to transmit data from the queues;

a switching matrix to provide selective connectivity between the plurality of ingress ports and the plurality of egress ports; and a scheduler to receive the requests, generate grants based thereon, and configure the switching matrix, wherein said scheduler monitors its efficiency by tracking requests granted and grants accepted for a defined period and if the efficiency is determined to be below a defined threshold said scheduler performs perturbation of its scheduling state, wherein said scheduler considers a scheduling phase inefficient if some predetermined amount of requests sent from sources or some predetermined amount of requests received by destinations are not granted, and wherein said scheduler is considered inefficient if more than a certain percentage of scheduling phases is considered inefficient.

2. The device of claim 1, wherein said scheduler determines if it is operating efficiently at fixed intervals.

3. The device of claim 2, wherein the fixed internals are a number of scheduling phases.

4. The device of claim 1, wherein the defined period is a number of scheduling phases.

5. The device of claim 1, wherein the tracking requests granted includes tracking number of sources sending requests being issued grants.

6. The device of claim 1, wherein the tracking requests granted includes tracking number of destinations receiving requests being issued grants.

7. The device of claim 1, wherein said scheduler performs perturbation by blocking requests from a particular source.

8. The device of claim 7, wherein the particular source is selected according to an arbitration scheme.

9. The device of claim 8, wherein the arbitration scheme is a round-robin.

10. The device of claim 8, wherein the selection of the particular source includes determining if requests for the particular source have been the same priority.

11. The device of claim 8, wherein the selection of the particular source includes determining throughput of the particular source.

12. The device of claim 1, wherein the plurality of queues store at least some subset of packets, segments, and frames.

13. The device of claim 1, wherein the requests indicate cumulative amount of data.

14. The device of claim 13, wherein the requests indicate the cumulative amount of data in terms of at least some combination of bytes, packets, segments, and frames.

15. The device of claim 1, further comprising a segmentation unit to receive variable size packets and to store the variable size packets as segments in the queues, wherein the variable size packets having a length greater than a maximum segment length are divided into multiple segments; and a reassembly unit to combine the segments making up a complete packet together to generate the packet.

16. The device of claim 15, further comprising a framer to aggregate a plurality of segments to form a frame, wherein the segments are retrieved from the at least one queue, and wherein the frame may contain segments associated with different packets; and a deframer to extract the segments from the frame.

17. The device of claim 13, wherein the requests also indicate other factors, wherein the other factors include at least some subset of priority and aging.

18. The device of claim 17, wherein the scheduler assigns the requests internal priority numbers based on at least some subset of the cumulative amount of data and the other factors, and generates the grants based at least in part on the internal priority numbers associated with the requests.

19. A method comprising:
receiving data from external sources;
storing the data waiting to be transmitted in queues, wherein the queues are associated with an external source from which the data came and an external destination to which the data is going;
generating requests for permission to transmit data from the queues;
receiving the requests at a scheduler;
generating grants in the scheduler based on the received requests;
monitoring the scheduler efficiency by tracking requests granted and grants accepted for a defined period, wherein a scheduling phase is considered inefficient if some predetermined amount of requests sent from sources or some predetermined amount of requests received by destinations are not granted, and wherein the scheduler is considered inefficient if more than a certain percentage of scheduling phases is considered inefficient;
performing perturbation when the scheduler is considered inefficient; and
selectively connecting the external sources and the external destinations based on the generated grants.

20. The method of claim 19, wherein said performing includes blocking requests associated with a specific source.

21. The method of claim 19, wherein said storing includes storing at least some subset of packet, segments and blocks in the queues.

22. The method of claim 19, wherein the requests indicate the cumulative amount of data in terms of bytes, packets, segments or frames.

23. The method of claim 22, wherein the requests also indicate other factors including at least some subset of priority and aging.

24. The method of claim 19, further comprising
dividing variable sized packets having a length greater than a maximum segment length into multiple segments, wherein said storing includes storing segments; and
reassembling the segments making up a complete packet together to generate the packet.

25. The method of claim 24, further comprising
aggregating a plurality of segments to form a frame, wherein the segments are retrieved from the at least one queue, and wherein the frame may contain segments associated with different packets; and
extracting the segments from the frame.

26. A store and forward device comprising
a plurality of Ethernet cards to receive data from and transmit data to external sources, wherein the plurality of Ethernet cards include
an ingress interface module to receive data from external sources, store the data in queues associated with at least some subset of destination and priority, generate requests for transmitting data, and transmit data from queues upon receipt of an associated grant; and
an egress interface module to receive data from the ingress interface module, and transmit the data to a destination;
a switching matrix to provide selective connectivity between the Ethernet cards;
a backplane consisting of a plurality of channels to connect the plurality of Ethernet cards to the switching matrix; and
a scheduler to receive the requests, process the requests and generate grants therefrom, and configure the switching matrix accordingly, wherein said scheduler monitors its efficiency by tracking requests granted and grants accepted for a defined period, wherein said scheduler considers a scheduling phase inefficient if some predetermined amount of requests sent from sources or some predetermined amount of requests received by destinations are not granted, and wherein said scheduler is considered inefficient if more than a certain percentage of scheduling phases is considered inefficient and the scheduler performs perturbation by blocking requests from a selected ingress interface module.

27. The device of claim 26, wherein
the data is variable sized packets;
the ingress interface module includes a segmentation unit to receive the variable sized packets and to store the variable sized packets as segments, wherein the variable sized packets having a length greater than a maximum segment length are divided into multiple segments; and
the egress interface module includes a reassembly unit to combine the segments making up a complete packet together to generate the packet.

28. The device of claim 27, wherein
the ingress interface module further includes a framer to aggregate a plurality of segments to form a frame, wherein the segments are retrieved from the at least one queue, and wherein the frame may contain segments associated with different packets; and
the egress interface module further includes a deframer to extract the segments from the frame.

29. The device of claim 26, wherein
the requests indicate at least some subset of quantity, priority and aging; and
the scheduler assigns the requests internal priority numbers based on at least some subset of the quantity, priority and aging, and generates the grants based at least in part on the internal priority numbers associated with the requests.

30. The device of claim 26, wherein the selected interface module is selected based on interface module throughput.

31. The device of claim 26, wherein the selected ingress interface module is selected based on ingress interface module throughput.

* * * * *